United States Patent
Cho et al.

(10) Patent No.: US 12,431,720 B2
(45) Date of Patent: Sep. 30, 2025

(54) CHARGER INTEGRATED CIRCUIT FOR CHARGING SERIES BATTERY DEVICE AND ELECTRONIC DEVICE INCLUDING SAME

(71) Applicant: Samsung Electronics Co., Ltd., Suwon-si (KR)

(72) Inventors: Yonghwan Cho, Suwon-si (KR); Sungwoo Lee, Hwaseong-si (KR); Hyoungseok Oh, Seoul (KR); Daewoong Cho, Suwon-si (KR); Jungwook Heo, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 567 days.

(21) Appl. No.: 17/953,755

(22) Filed: Sep. 27, 2022

(65) Prior Publication Data

US 2023/0142751 A1   May 11, 2023

(30) Foreign Application Priority Data

Nov. 9, 2021   (KR) .................. 10-2021-0152781
Feb. 8, 2022   (KR) .................. 10-2022-0015949

(51) Int. Cl.
*H02J 7/00*   (2006.01)

(52) U.S. Cl.
CPC ...... *H02J 7/0019* (2013.01); *H02J 7/007182* (2020.01); *H02J 2207/20* (2020.01); *H02J 2207/40* (2020.01)

(58) Field of Classification Search
CPC .......... H02J 7/0019; H02J 7/007182; H02J 2207/20; H02J 2207/40; H02J 7/0068;
(Continued)

(56) References Cited

U.S. PATENT DOCUMENTS 10,250,059 B2   4/2019   Aldehayyat et al.
10,454,292 B2   10/2019   Lee et al.
(Continued)

FOREIGN PATENT DOCUMENTS

| | | |
|---|---|---|
| GB | 2578828 A | 5/2020 |
| KR | 2016-0098863 A | 8/2016 |
| TW | 202135369 A | 9/2021 |

OTHER PUBLICATIONS

Extended European Search Report, issued Apr. 3, 2023 in corresponding European Patent Application No. 22205875.2.

Primary Examiner — Huy Q Phan
(74) Attorney, Agent, or Firm — Fish & Richardson P.C.

(57) ABSTRACT

A charger integrated circuit is configured to charge a battery device including a first battery and a second battery connected in series. The circuit includes a direct charger configured to generate a first charging current and a first current based on an input voltage received from an input terminal, the first current used to generate a first system current, and a buck converter configured to generate a second current and a second system current based on the input voltage, the second current used to generate a second charging current. The circuit includes a switched capacitor configured to generate the first system current based on the first current, and to generate the second charging current based on the second current, and a linear charger configured to provide the first charging current and the second charging current to the battery device.

20 Claims, 21 Drawing Sheets

(58) Field of Classification Search
CPC .......... H02J 7/0063; H02J 1/06; H02J 7/0013; H02J 7/007; H02M 1/0045; H02M 1/007; H02M 1/009; H02M 3/07; H02M 3/072; H02M 3/158
USPC ........................................................ 320/107
See application file for complete search history.

(56) References Cited

U.S. PATENT DOCUMENTS

| | | |
|---|---|---|
| 10,468,898 B2 | 11/2019 | Crosby et al. |
| 2020/0127467 A1 | 4/2020 | Li |
| 2020/0295587 A1 | 9/2020 | Giuliano et al. |
| 2020/0366183 A1* | 11/2020 | Lam ........................ G06F 1/263 |
| 2021/0075244 A1 | 3/2021 | Cho et al. |
| 2021/0111570 A1 | 4/2021 | Cho et al. |
| 2021/0213842 A1 | 7/2021 | Lee et al. |
| 2021/0281085 A1 | 9/2021 | Lee et al. |
| 2022/0140651 A1* | 5/2022 | Eftimie .................. H02J 50/10 320/108 |
| 2022/0294248 A1* | 9/2022 | Xu ........................ H02M 1/007 |

\* cited by examiner

CHARGER INTEGRATED CIRCUIT FOR CHARGING SERIES BATTERY DEVICE AND ELECTRONIC DEVICE INCLUDING SAME

CROSS-REFERENCE TO RELATED APPLICATION

This application claims priority under 35 USC § 119 to Korean Patent Application No. 10-2021-0152781 filed on Nov. 9, 2021, and to Korean Patent Application No. 10-2022-0015949 filed on Feb. 8, 2022, in the Korean Intellectual Property Office (KIPO), the contents of which are herein incorporated by reference in their entirety.

FIELD

Some example embodiments relate generally to semiconductor integrated circuits, charger integrated circuits for charging series battery devices including a plurality of batteries, and electronic devices including the charger integrated circuits.

BACKGROUND

Portable electronic devices such as mobile phones include batteries. The power demands placed upon mobile phone batteries have gradually increased over time, and now face further increases with the advent of 5G technology and applications. And it is possible that current battery technology, battery power storing capacity and battery charging approaches may unduly limit the operating performance of emerging mobile phones. Accordingly, improved battery technology, improved battery charging efficiency, increased battery power storage capacities, as well as longer, useful battery lives are subjects of ongoing research and development. For example, a series battery device including a plurality of batteries that are connected in series has been used, and thus, the importance of efficient charging and/or fast charging for the series battery device including the plurality of batteries is increasing.

SUMMARY

Some example embodiments of the present inventive concepts provide a charger integrated circuit capable of stably supplying a system voltage while charging a high voltage of a series battery device.

Some example embodiments of the present inventive concepts provide an electronic device including the charger integrated circuit.

According to some example embodiments, a charger integrated circuit configured to charge a battery device including a first battery and a second battery connected in series includes a direct charger configured to generate a first charging current and a first current based on an input voltage received from an input terminal, the first charging current used to charge the battery device, the first current used to generate a first system current, and the first system current provided to a system load. The circuit includes a buck converter configured to generate a second current and a second system current based on the input voltage, the second current used to generate a second charging current, the second charging current used to charge the battery device, and the second system current provided to the system load. The circuit includes a switched capacitor configured to generate the first system current based on the first current, and to generate the second charging current based on the second current, and a linear charger configured to provide the first charging current and the second charging current to the battery device.

According to some example embodiments, an electronic device includes a battery device including a first battery and a second battery connected in series, a charger integrated circuit configured to charge the battery device, and a system load configured to operate based on an input voltage received from an input terminal and a battery voltage received from the battery device. The charger integrated circuit includes a direct charger configured to generate a first charging current and a first current based on the input voltage, the first charging current used to charge the battery device, the first current used to generate a first system current, and the first system current provided to the system load. The circuit includes a buck converter configured to generate a second current and a second system current based on the input voltage, the second current used to generate a second charging current, the second charging current used to charge the battery device, and the second system current provided to the system load. The circuit includes a switched capacitor configured to generate the first system current based on the first current, and to generate the second charging current based on the second current, and a linear charger configured to provide the first charging current and the second charging current to the battery device.

According to some example embodiments, a charger integrated circuit configured to charge a battery device including a first battery and a second battery connected in series includes a direct charger including a first switch and a second switch connected in series between an input terminal and a control node. The direct charger is configured to enable in response to an input voltage having a variable voltage level, to generate a first charging current and a first current based on the input voltage while enabled, and to disable in response to the input voltage having a fixed voltage level, the input voltage received from the input terminal, the first charging current used to charge the battery device, the first current used to generate a first system current, the first system current provided to a system load. The circuit includes a buck converter including a third switch, a fourth switch and a fifth switch connected in series between the input terminal and a ground voltage, and a first inductor connected between a switching node and a system node, the switching node between the fourth switch and the fifth switch, the system node connected to the system load. The buck converter is configured to enable in response to the input voltage having the fixed voltage level, to generate a second current and a second system current based on the input voltage while enabled, and to disable in response to the input voltage having the variable voltage level, the second current used to generate a second charging current, the second charging current used to charge the battery device, and the second system current provided to the system load. The circuit includes a switched capacitor configured to generate the first system current based on the first current in response to the input voltage having the variable voltage level, and to generate the second charging current based on the second current in response to the input voltage having the fixed voltage level, and a linear charger configured to provide the first charging current to the battery device in response to the input voltage having the variable voltage level, and to provide the second charging current to the battery device in response to the input voltage having the fixed voltage level. The linear charger includes a sixth switch connected between the control node and the battery device, and each of the first switch, the second switch, the third switch, the fourth switch, the fifth switch and the sixth switch including one transistor and one diode.

In the charger integrated circuit and the electronic device according to some example embodiments, the buck converter may be included rather than a buck-boost converter, and an additional buck converter may be omitted. In addition, the operation of the switched capacitor may be changed depending on whether the input voltage has the variable voltage level or the fixed voltage level. For example, the switched capacitor may supply the system current to the system load or may supply the charging current to the battery device. Accordingly, the number of circuits, the number of transistors and the circuit area may be reduced as compared to a conventional charger integrated circuit, and a charging scheme for stably supplying the system voltage while charging the high battery voltage of the battery device including the batteries connected in series may be efficiently implemented.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
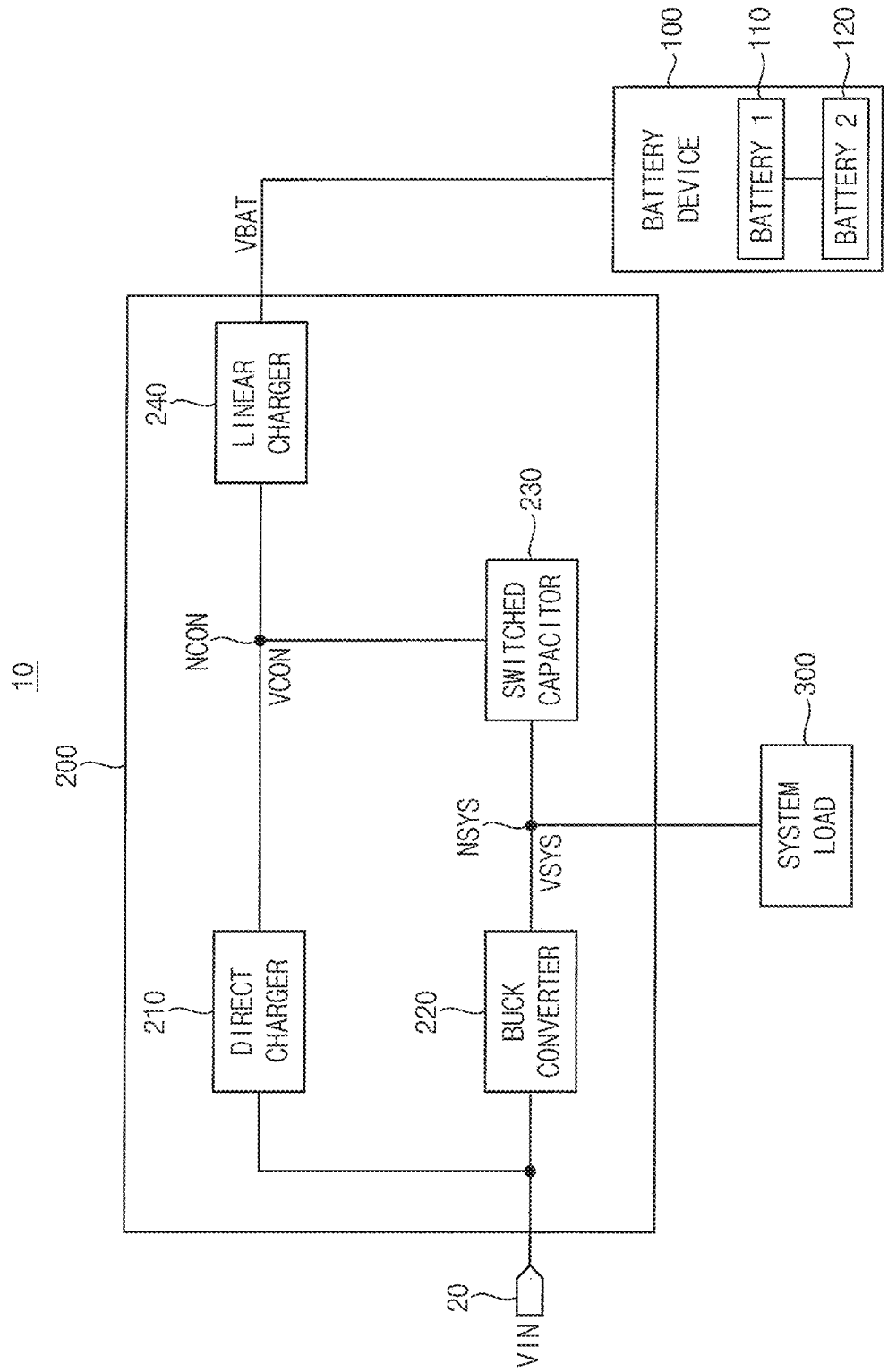
FIG. 1 is a block diagram illustrating a charger integrated circuit and an electronic device including the charger integrated circuit according to some example embodiments.

Various example embodiments will be described more fully with reference to the accompanying drawings, in which some example embodiments are shown. The present inventive concepts may, however, be embodied in many different forms and should not be construed as limited to the example embodiments set forth herein. Like reference numerals refer to like elements throughout this application.

FIG. 1 is a block diagram illustrating a charger integrated circuit and an electronic device including the charger integrated circuit according to some example embodiments.

Referring to FIG. 1, an electronic device 10 includes a battery device 100, a charger integrated circuit (IC) 200 and a system load 300. The electronic device 10 may further include an input terminal (or input voltage terminal) 20.

The battery device 100 includes a first battery 110 and a second battery 120 that are connected in series. As the electronic device 10 is implemented with high specifications and performs high-performance operations, an increase in battery capacity is desired or required, and thus the battery device 100 includes a plurality of batteries 110 and 120 connected in series. The electronic device 10 may perform or execute the high-performance operations using the battery device 100 including the plurality of batteries 110 and 120.

In some example embodiments, the battery device 100 may be embedded in the electronic device 10. In some example embodiments, the battery device 100 may be mechanically attachable to and/or detachable from the electronic device 10. Although FIG. 1 illustrates that the battery device 100 includes two batteries 110 and 120, example embodiments are not limited thereto. For example, as will be described with reference to FIG. 10, the battery device may include three or more batteries that are connected in series.

In some example embodiments, the first battery 110 may be a first battery cell, a first multi-cell arrangement of batteries, a first battery pack, etc. Similarly, the second battery 120 may be a second battery cell, a second multi-cell arrangement of batteries, a second battery pack, etc. Therefore, the battery device 100 may be variously configured as an arrangement of multiple batteries, and may be variously implemented using at least one battery pack. For example, the first battery 110 may be a first battery pack, the second battery 120 may be a second battery pack, and the battery device 100 may be implemented by a battery device including a plurality of battery packs. In some example embodiments, at least one of the first battery pack and the second battery packs may be a multi-cell battery including two or more battery cells, and at least one of the first battery pack and the second battery pack may be a single-cell battery including one battery cell.

The input terminal 20 may receive an input voltage VIN. For example, the input terminal 20 may be electrically connected to an external power supply by a travel adapter (TA).

A travel adapter (such as one selected from various available travel adapters) may be used to convert an external power supply voltage (e.g., a nominal 110V or 220V power supply) into the input voltage VIN (e.g., a direct current (DC) voltage) compatible with the electronic device 10 (e.g., a computer or smart phone). The input voltage VIN may also be used to charge the battery device 100.

In some example embodiments, the input terminal 20 may be electrically connected to an output terminal of an auxiliary battery. Alternately, the input terminal 20 may be electrically connected to another electronic device (e.g., another smart phone). Regardless of external connection type, the charger integrated circuit 200 may be used to charge the battery device 100 using a voltage (e.g., a DC power voltage) provided by the travel adapter, the auxiliary battery, or the like.

The charger integrated circuit 200 is a circuit used to charge the battery device 100. For example, the charger integrated circuit 200 may be implemented by an integrated circuit chip mounted on a printed circuit board (PCB). The charger integrated circuit 200 may be referred to as a battery charger.

The charger integrated circuit 200 includes a direct charger 210, a buck converter 220, a switched capacitor 230 and a linear charger 240.

The direct charger 210 generates a first charging current and a first current based on the input voltage VIN received from the input terminal 20. The first charging current is used to charge the battery device 100, and the first current is used to generate a first system current provided to the system load 300. The direct charger 210 may be connected between the input terminal 20 and a control node NCON. The control node NCON may be a node at which a control voltage VCON is formed.

The buck converter 220 generates a second current and a second system current based on the input voltage VIN. The second current is used to generate a second charging current used to charge the battery device 100, and the second system current is provided to the system load 300. The buck converter 220 may be connected between the input terminal 20 and a system node NSYS. The system node NSYS may be a node that is connected to the system load 300 and at which a system voltage VSYS is formed. For example, the buck converter 220 may convert a relatively high DC voltage into a relatively low DC voltage. The buck converter 220 may be referred to as a buck charger.

The switched capacitor 230 generates the first system current based on the first current, and generates the second charging current based on the second current. In addition, the switched capacitor 230 may generate a third system current based on a battery voltage VBAT provided from the battery device 100. The switched capacitor 230 may be connected between the control node NCON and the system node NSYS.

The linear charger 240 provides the first charging current and the second charging current to the battery device 100. The linear charger 240 may be connected between the control node NCON and the battery device 100 that provides the battery voltage VBAT. A voltage level of the control voltage VCON and a voltage level of the battery voltage VBAT may be equal or substantially equal to each other.

In some example embodiments, activations and operations of components included in the charger integrated circuit 200 may be changed depending on whether the input voltage VIN is received, and a voltage level of the input voltage VIN. Detailed operations of the charger integrated circuit 200 will be described with reference to FIGS. 2A, 2B and 2C.

In some example embodiments, each of the direct charger 210, the buck converter 220, the switched capacitor 230 and the linear charger 240 included in the charger integrated circuit 200 may include at least one transistor. Detailed configurations of the charger integrated circuit 200 will be described with reference to FIGS. 3, 4A, 4B, 4C, 5 and 6.

The system load 300 may operate based on the system voltage VSYS and/or one of the first, second and third system currents. For example, the system load 300 may include chips or modules included in the electronic device 10, for example, a modem, an application processor, a memory, a display, and/or the like. For example, the system load 300 may include an operation block, a functional block or an intellectual property (IP) block included in the electronic device 10, for example, a multimedia block, a memory controller in the application processor, and/or the like.

In some example embodiments, the electronic device 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

Figure 2A:
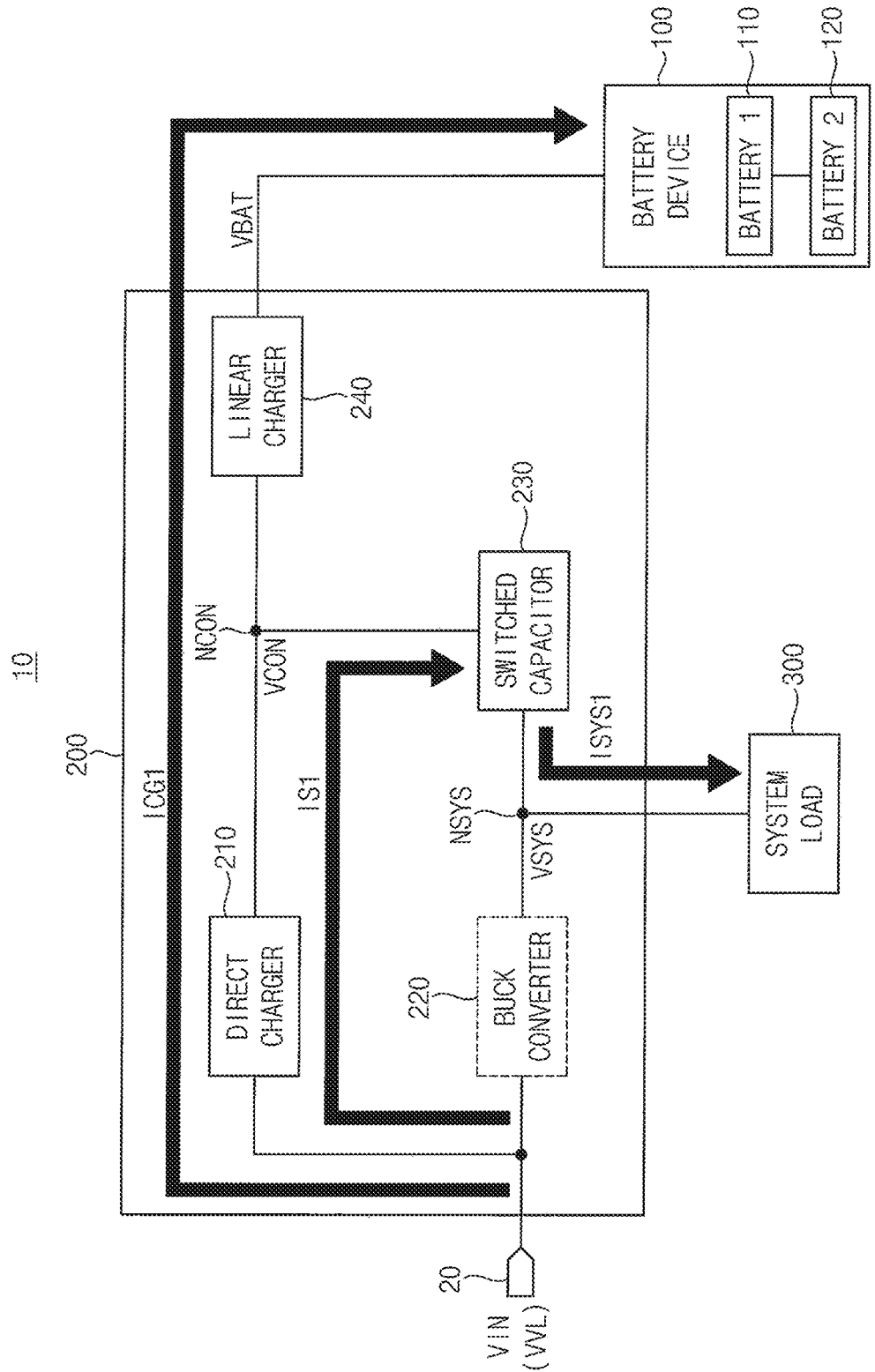
FIGS. 2A, 2B and 2C are diagrams for describing operations of a charger integrated circuit and an electronic device of FIG. 1.
Figure 2B:
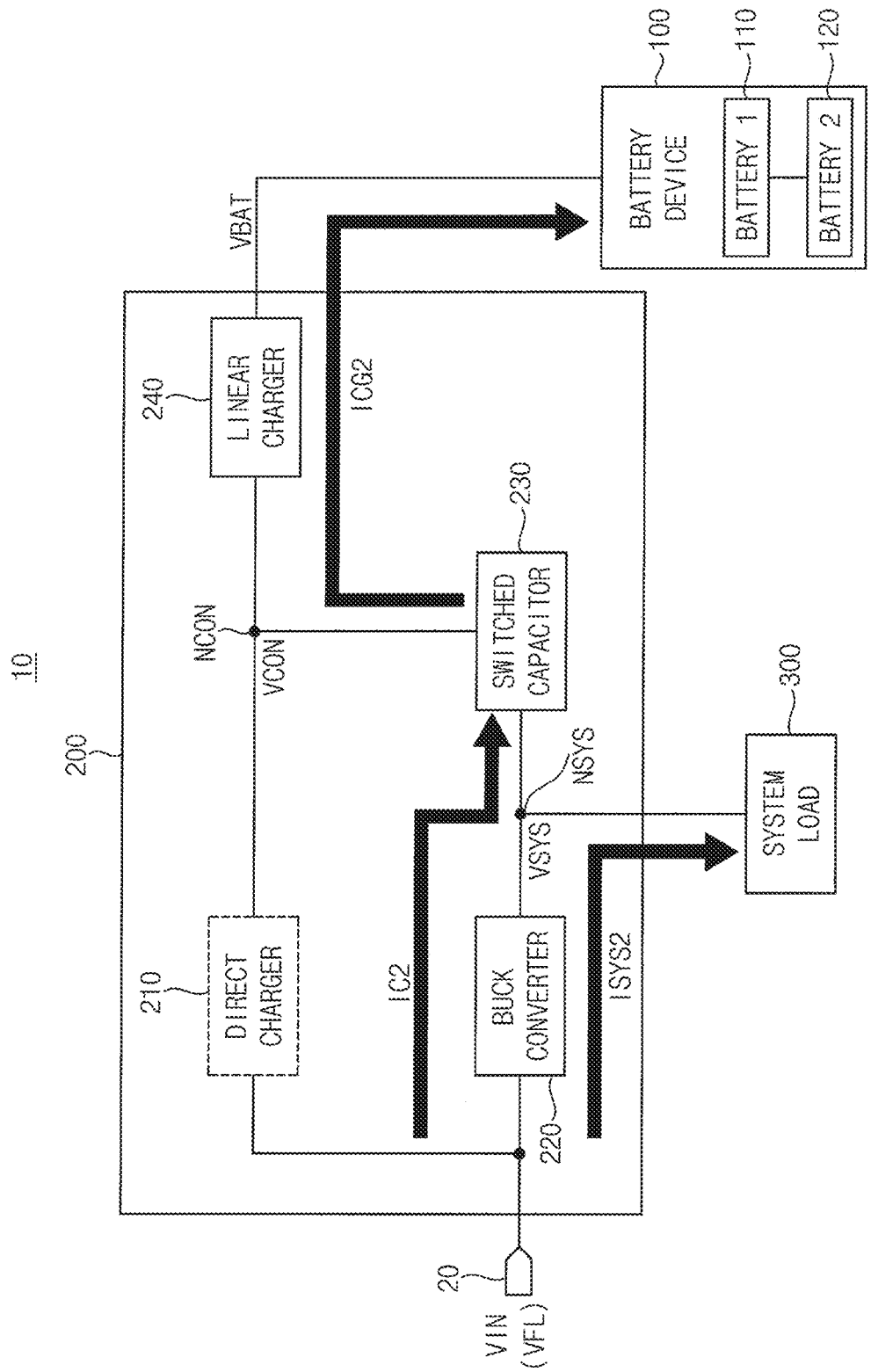
Figure 2C:
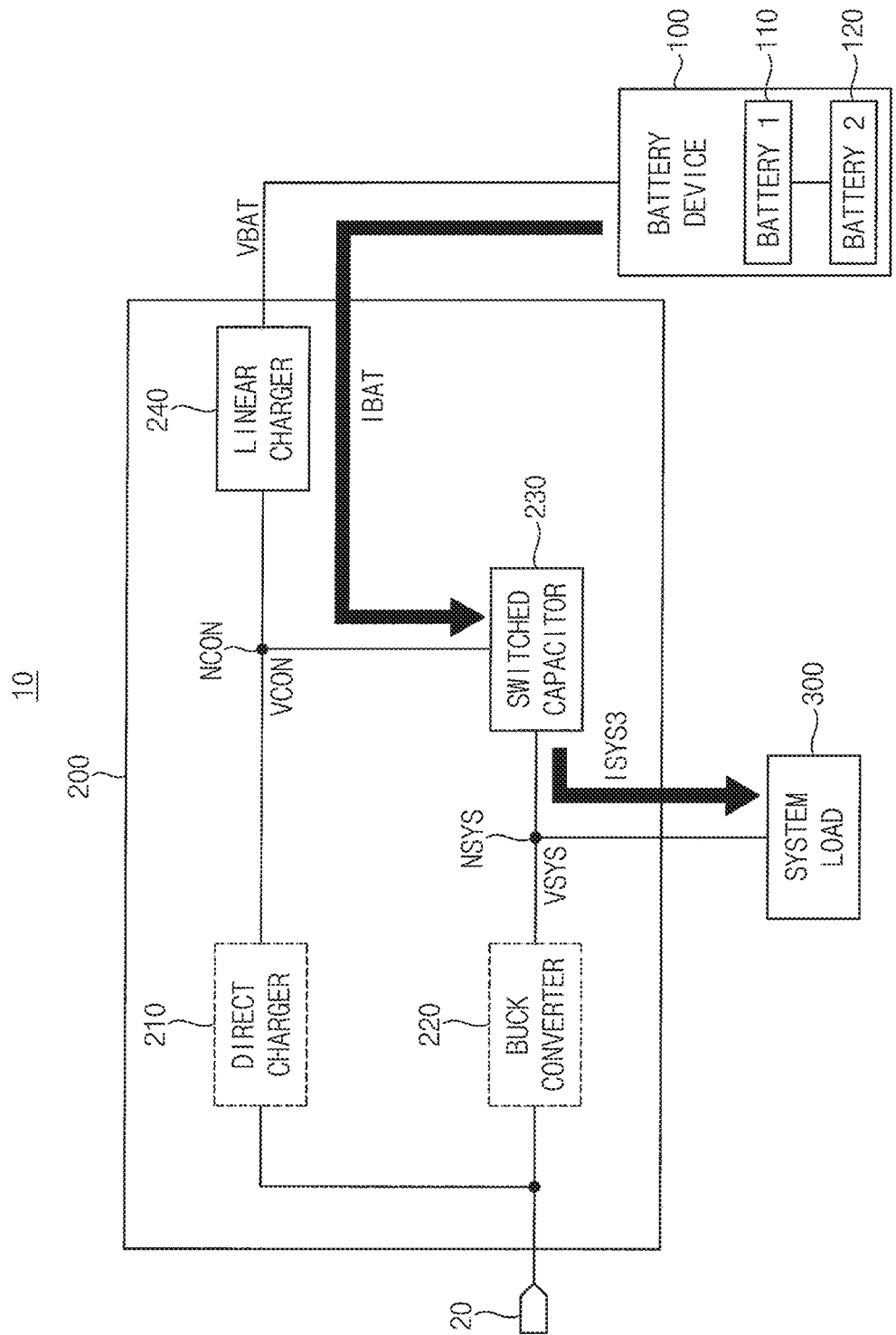

FIGS. 2A, 2B and 2C are diagrams for describing operations of a charger integrated circuit and an electronic device of FIG. 1.

Referring to FIG. 2A, when the input voltage VIN is received from the input terminal 20, and when the input voltage VIN has a variable voltage level VVL, the direct charger 210 may be enabled (or activated), and the buck converter 220 may be disabled (or deactivated). In FIG. 2A and subsequent figures, a disabled component is illustrated by a dotted line.

When the input voltage VIN has the variable voltage level VVL, the direct charger 210 may generate a first charging current ICG1 for charging the battery device 100 and a first current IS1 for generating a first system current ISYS1 provided to the system load 300. The switched capacitor 230 may generate the first system current ISYS1 and the system voltage VSYS based on the first current IS1, and the control node NCON and the system node NSYS may correspond to an input terminal and an output terminal of the switched capacitor 230, respectively. For example, the amount of the first current IS1 may be about a half of the amount of the first system current ISYS1, and a voltage level of the system voltage VSYS may be about a half of a voltage level of the control voltage VCON. In other words, a voltage obtained by reducing the control voltage VCON (or the battery voltage VBAT) to about half through the switched capacitor 230 may be supplied as the system voltage VSYS. The linear charger 240 may provide the first charging current ICG1 to the battery device 100, and the battery device 100 may be charged based on the first charging current ICG1.

In some example embodiments, a charging operation illustrated in FIG. 2A may be an operation in a high-speed (or fast) charging mode (or a first charging mode). For example, the direct charger 210 may be enabled in the high-speed charging mode, and thus the battery device 100 may be directly charged by directly providing the first charging current ICG1 to the battery device 100. For example, the direct charger 210 may directly charge the battery device 100 based on a direct charging scheme in which the input voltage VIN is directly connected to the battery device 100, and the charging efficiency of the direct charging scheme may be relatively high.

In some example embodiments, the high-speed charging mode may correspond to a case in which the input voltage VIN is able to be precisely controlled, and/or a case in which the input voltage VIN has the variable voltage level VVL. For example, when a connected travel adapter supports universal serial bus power delivery (USB PD) 3.0 operation, the direct charger 210 may be enabled to operate in the high-speed charging mode. However, example embodiments are not limited thereto.

Referring to FIG. 2B, when the input voltage VIN is received from the input terminal 20, and when the input voltage VIN has a fixed voltage level VFL, the buck converter 220 may be enabled, and the direct charger 210 may be disabled.

When the input voltage VIN has the fixed voltage level VFL, the buck converter 220 may generate a second current IC2 for generating a second charging current ICG2 for charging the battery device 100 and a second system current ISYS2 provided to the system load 300. The switched capacitor 230 may generate the second charging current ICG2 based on the second current IC2, and the system node NSYS and the control node NCON may correspond to an input terminal and an output terminal of the switched capacitor 230, respectively. For example, the amount of the second current IC2 may be about twice the amount of the second charging current ICG2, and a voltage level of the control voltage VCON may be about twice a voltage level of the system voltage VSYS. In other words, a voltage obtained by boosting the system voltage VSYS by about twice through the switched capacitor 230 may be supplied as the control voltage VCON (or the battery voltage VBAT). The linear charger 240 may provide the second charging current ICG2 to the battery device 100, and the battery device 100 may be charged based on the second charging current ICG2.

In some example embodiments, a charging operation illustrated in FIG. 2B may be an operation in a normal charging mode (or a second charging mode). For example, the buck converter 220 may be enabled in the normal charging mode, and thus the battery device 100 may be charged by providing the second charging current ICG2 to the battery device 100 through the switched capacitor 230.

In some example embodiments, the normal charging mode may correspond to a case in which the input voltage VIN cannot be precisely controlled, or a case in which the input voltage VIN has the fixed voltage level VFL. For example, when a connected travel adapter supports a fixed-voltage operation, the direct charger 210 may be disabled and the buck converter 220 may be enabled. However, example embodiments are not limited thereto.

In some example embodiments, the fixed voltage level VFL of the input voltage VIN may be lower than the voltage level of the battery voltage VBAT. For example, when the connected travel adapter supports a low-voltage operation, the fixed voltage level VFL may be about 5V, and the voltage level of the battery voltage VBAT may be about 8.4V. In other example embodiments, the fixed voltage level VFL of the input voltage VIN may be higher than the voltage level of the battery voltage VBAT. For example, when the connected travel adapter supports a high-voltage operation, the fixed voltage level VFL may be about 9V, and the voltage level of the battery voltage VBAT may be about 8.4V. However, example embodiments are not limited thereto.

Referring to FIG. 2C, when the input voltage VIN is not received from the input terminal 20, both the direct charger 210 and the buck converter 220 may be disabled.

When the input voltage VIN is not received from the input terminal 20, the battery device 100 may not be charged, and the electronic device 10 may operate based on a battery current IBAT and the battery voltage VBAT that are supplied from the battery device 100. The linear charger 240 may provide the battery current IBAT to the switched capacitor 230. The switched capacitor 230 may generate a third system current ISYS3 provided to the system load 300 based on the battery current IBAT, and the control node NCON and the system node NSYS may correspond to an input terminal and an output terminal of the switched capacitor 230, respectively. For example, the amount of the battery current IBAT may be about a half of the amount of the third system current ISYS3, and a voltage level of the system voltage VSYS may be a half of a voltage level of the control voltage VCON. In other words, a voltage obtained by reducing the control voltage VCON (or the battery voltage VBAT) to about half through the switched capacitor 230 may be supplied as the system voltage VSYS.

In some example embodiments, an operation illustrated in FIG. 2C may be an operation in a discharging mode.

As described above, the direct charger 210 and the buck converter 220 may be enabled or disabled depending on the operation mode. In addition, in some example embodiments the switched capacitor 230 and the linear charger 240 may always maintain the enabled state regardless of the operation mode.

In the charger integrated circuit 200 according to some example embodiments, the buck converter 220 may be included rather than a buck-boost converter, and an additional buck converter may be omitted. In addition, the operation of the switched capacitor 230 may be changed depending on whether the input voltage VIN has the variable voltage level VVL or the fixed voltage level VFL. For example, the switched capacitor 230 may supply the system current ISYS1 to the system load 300 or may supply the charging current ICG2 to the battery device 100. Accordingly, the number of circuits, the number of transistors and the circuit area may be reduced as compared to a conventional charger integrated circuit, and a charging scheme for stably supplying the system voltage VSYS while charging the high battery voltage VBAT of the battery device 100 including the batteries 110 and 120 connected in series may be efficiently implemented.

Figure 3:
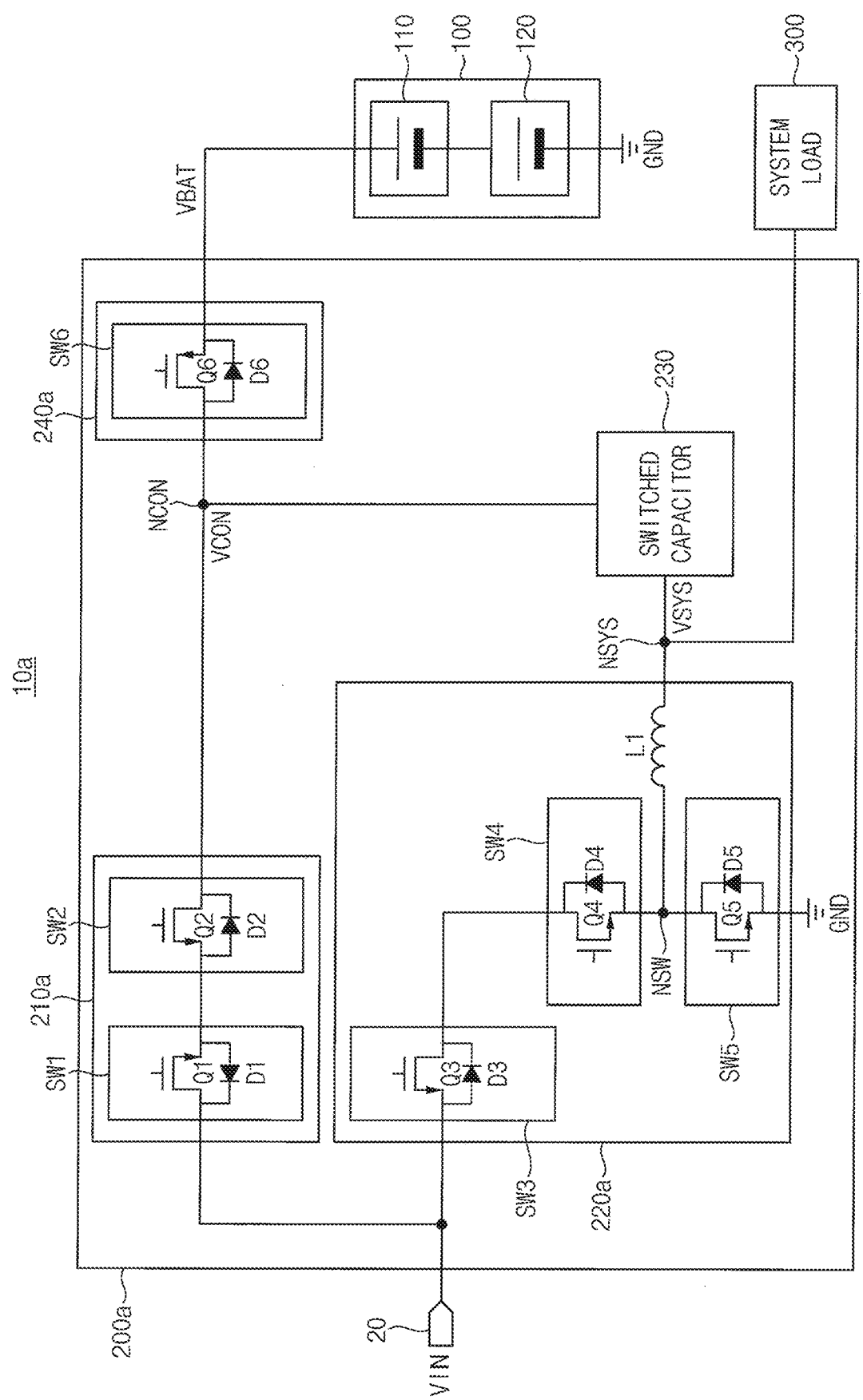
FIG. 3 is a diagram illustrating an example embodiment of a charger integrated circuit and an electronic device of FIG. 1.

FIG. 3 is a diagram illustrating an example embodiment of a charger integrated circuit and an electronic device of FIG. 1. The descriptions repeated with FIG. 1 will be omitted.

Referring to FIG. 3, an electronic device 10a includes a battery device 100, a charger integrated circuit 200a and a system load 300. The electronic device 10a may further include an input terminal 20.

The input terminal 20, the battery device 100 and the system load 300 may be the same or substantially the same as the input terminal 20, the battery device 100 and the system load 300 in FIG. 1, respectively.

The charger integrated circuit 200a may include a direct charger 210a, a buck converter 220a, a switched capacitor 230 and a linear charger 240a.

The direct charger 210a may correspond to the direct charger 210 in FIG. 1, and may include a first switch SW1 and a second switch SW2. The first switch SW1 and the second switch SW2 may be connected in series between the input terminal 20 and the control node NCON, and may provide the input voltage VIN (e.g., the first charging current ICG1 and the first current IS1 based on the input voltage VIN) to the control node NCON.

In some example embodiments, each of the first switch SW1 and the second switch SW2 may include one transistor and one diode. For example, the first switch SW1 may include a first transistor Q1 and a first diode D1, and the second switch SW2 may include a second transistor Q2 and a second diode D2.

Each of the first transistor Q1 and the second transistor Q2 may be an n-type metal oxide semiconductor (NMOS)

transistor. For example, the first transistor Q1 may include a first electrode (e.g., a drain electrode) connected to the input terminal 20, a second electrode (e.g., a source electrode) connected to the second transistor Q2, and a control electrode (e.g., a gate electrode). The second transistor Q2 may include a first electrode (e.g., a source electrode) connected to the first transistor Q1, a second electrode (e.g., a drain electrode) connected to the control node NCON, and a control electrode (e.g., a gate electrode). A control signal may be applied to the control electrode of each of the first and second transistors Q1 and Q2.

The first diode D1 may include a first electrode (e.g., a cathode electrode) connected to the first electrode of the first transistor Q1, and a second electrode (e.g., an anode electrode) connected to the second electrode of the first transistor Q1. For example, the first diode D1 may be a parasitic diode of the first transistor Q1. An unintentional leakage current flowing in a direction toward the second transistor Q2 may be inhibited or prevented by the first diode D1 even when the first transistor Q1 is turned off.

The second diode D2 may include a first electrode (e.g., an anode electrode) connected to the first electrode of the second transistor Q2, and a second electrode (e.g., a cathode electrode) connected to the second electrode of the second transistor Q2. For example, the second diode D2 may be a parasitic diode of the second transistor Q2. An unintentional leakage current flowing in a direction toward the first transistor Q1 may be inhibited or prevented by the second diode D2 even when the second transistor Q2 is turned off.

The buck converter 220a may correspond to the buck converter 220 in FIG. 1, and may include a third switch SW3, a fourth switch SW4, a fifth switch SW5 and a first inductor L1. The third switch SW3, the fourth switch SW4 and the fifth switch SW5 may be connected in series between the input terminal 20 and a ground voltage GND. The third switch SW3 and the fourth switch SW4 may be connected in series between the input terminal 20 and a switching node NSW, and may provide the input voltage VIN (e.g., the second current IC2 and the second system current ISYS2 based on the input voltage VIN) to the switching node NSW. The fifth switch SW5 may be connected between the switching node NSW and the ground voltage GND, and may provide the ground voltage GND to the switching node NSW. For example, the third switch SW3 may be turned on in the charging mode, and thus the third switch SW3 may be referred to as a charging switch. The fourth switch SW4 and the fifth switch SW5 may be alternately turned on. The first inductor L1 may be connected between the switching node NSW, which is a node between the fourth switch SW4 and the fifth switch SW5, and the system node NSYS.

In some example embodiments, each of the third switch SW3, the fourth switch SW4 and the fifth switch SW5 may include one transistor and one diode. For example, the third switch SW3 may include a third transistor Q3 and a third diode D3, the fourth switch SW4 may include a fourth transistor Q4 and a fourth diode D4, and the fifth switch SW5 may include a fifth transistor Q5 and a fifth diode D5.

Each of the third transistor Q3, the fourth transistor Q4 and the fifth transistor Q5 may be an NMOS transistor. For example, the third transistor Q3 may include a first electrode (e.g., a source electrode) connected to the input terminal 20, a second electrode (e.g., a drain electrode) connected to the fourth transistor Q4, and a control electrode (e.g., a gate electrode). The fourth transistor Q4 may include a first electrode (e.g., a drain electrode) connected to the third transistor Q3, a second electrode (e.g., a source electrode) connected to the switching node NSW, and a control electrode (e.g., a gate electrode). The fifth transistor Q5 may include a first electrode (e.g., a drain electrode) connected to the switching node NSW, a second electrode (e.g., a source electrode) connected to the ground voltage GND, and a control electrode (e.g., a gate electrode). A control signal may be applied to the control electrode of each of the third to fifth transistors Q3, Q4 and Q5.

The third diode D3 may include a first electrode (e.g., an anode electrode) connected to the first electrode of the third transistor Q3, and a second electrode (e.g., a cathode electrode) connected to the second electrode of the third transistor Q3. For example, the third diode D3 may be a parasitic diode of the third transistor Q3. An unintentional leakage current flowing in a direction toward the input terminal 20 may be inhibited or prevented by the third diode D3 even when the third transistor Q3 is turned off.

The fourth diode D4 may include a first electrode (e.g., a cathode electrode) connected to the first electrode of the fourth transistor Q4, and a second electrode (e.g., an anode electrode) connected to the second electrode of the fourth transistor Q4. For example, the fourth diode D4 may be a parasitic diode of the fourth transistor Q4. An unintentional leakage current flowing in a direction toward the switching node NSW may be inhibited or prevented by the fourth diode D4 even when the fourth transistor Q4 is turned off.

The fifth diode D5 may include a first electrode (e.g., a cathode electrode) connected to the first electrode of the fifth transistor Q5, and a second electrode (e.g., an anode electrode) connected to the second electrode of the fifth transistor Q5. For example, the fifth diode D5 may be a parasitic diode of the fifth transistor Q5. An unintentional leakage current flowing in a direction toward the ground voltage GND may be inhibited or prevented by the fifth diode D5 even when the fifth transistor Q5 is turned off.

The linear charger 240a may correspond to the linear charger 240 in FIG. 1, and may include a sixth switch SW6. The sixth switch SW6 may be connected between the control node NCON and the battery device 100. The sixth switch SW6 may provide the control voltage VCON (e.g., the first charging current ICG1 and the second charging current ICG2 based on the control voltage VCON) to the battery device 100, or may provide the battery voltage VBAT (e.g., the battery current IBAT based on the battery voltage VBAT) to the switched capacitor 230.

In some example embodiments, the sixth switch SW6 may include one transistor and one diode. For example, the sixth switch SW6 may include a sixth transistor Q6 and a sixth diode D6.

The sixth transistor Q6 may be a p-type metal oxide semiconductor (PMOS) transistor. For example, the sixth transistor Q6 may include a first electrode (e.g., a drain electrode) connected to the control node NCON, a second electrode (e.g., a source electrode) connected to the battery device 100, and a control electrode (e.g., a gate electrode). A control signal may be applied to the control electrode of the sixth transistor Q6.

The sixth diode D6 may include a first electrode (e.g., an anode electrode) connected to the first electrode of the sixth transistor Q6, and a second electrode (e.g., a cathode electrode) connected to the second electrode of the sixth transistor Q6. For example, the sixth diode D6 may be a parasitic diode of the sixth transistor Q6. An unintentional leakage current flowing in a direction toward the control node NCON may be inhibited or prevented by the sixth diode D6 even when the sixth transistor Q6 is turned off.

In some example embodiments, at least one of the first to sixth switches SW1, SW2, SW3, SW4, SW5 and SW6 may have a current control function, and may be used as a variable resistor. For example, the first switch SW1 and the second switch SW2 may have a current control function to control a current (e.g., the first charging current ICG1 and the first current IS1) flowing through the direct charger 210a in the high-speed charging mode. For example, the third switch SW3 may have a current control function to control a current (e.g., the second current IC2 and the second system current ISYS2) flowing through the buck converter 220a in the normal charging mode. For example, the sixth switch SW6 may have a current control function to control a current (e.g., the first charging current ICG1 and the second charging current ICG2) supplied to the battery device 100 in the high-speed charging mode and the normal charging mode. The current control function will be described with reference to FIG. 7.

In some example embodiments, the first to sixth switches SW1, SW2, SW3, SW4, SW5 and SW6 and the first to sixth transistors Q1, Q2, Q3, Q4, Q5 and Q6 included therein may be driven by a control circuit. For example, the control circuit may correspond to a current control circuit 260 in FIG. 7, and may be included in the charging integrated circuit. In some example embodiments, the control circuit may correspond to a control circuit 1300 in FIG. 15, and may be disposed outside the charging integrated circuit.

Although not illustrated in FIG. 3, each of the first to sixth switches SW1, SW2, SW3, SW4, SW5 and SW6 may include a body switch rather than a respective one of the diodes D1, D2, D3, D4, D5 and D6. For example, each of the first to sixth switches SW1, SW2, SW3, SW4, SW5 and SW6 may reduce a leakage current using a body switching technique.

In some example embodiments, the direct charger 210a may include two transistors Q1 and Q2, the buck converter 220a may include three transistors Q3, Q4 and Q5, and the linear charger 240a may include one transistor Q6, and thus the number of transistors included in the direct charger 210a, the buck converter 220a and the linear charger 240a may be six.

However, example embodiments are not limited thereto. For example, the direct charger may include three or more transistors, or may include only one of the transistors Q1 and Q2. For example, the buck converter may include four or more transistors, or may include only two or fewer of the transistors Q3, Q4 and Q5. For example, the linear charger may include two or more transistors. However, as described above, the charger integrated circuit according to some example embodiments may have a structure in which a buck-boost converter is replaced with a buck converter and an additional buck converter is omitted as compared to a conventional structure, and thus the number of circuits, the number of transistors and the circuit area may be reduced as compared to the conventional structure.

The switched capacitor 230 may correspond to the switched capacitor 230 in FIG. 1. An example of the switched capacitor 230 will be described with reference to FIGS. 5 and 6.

Figure 4A:
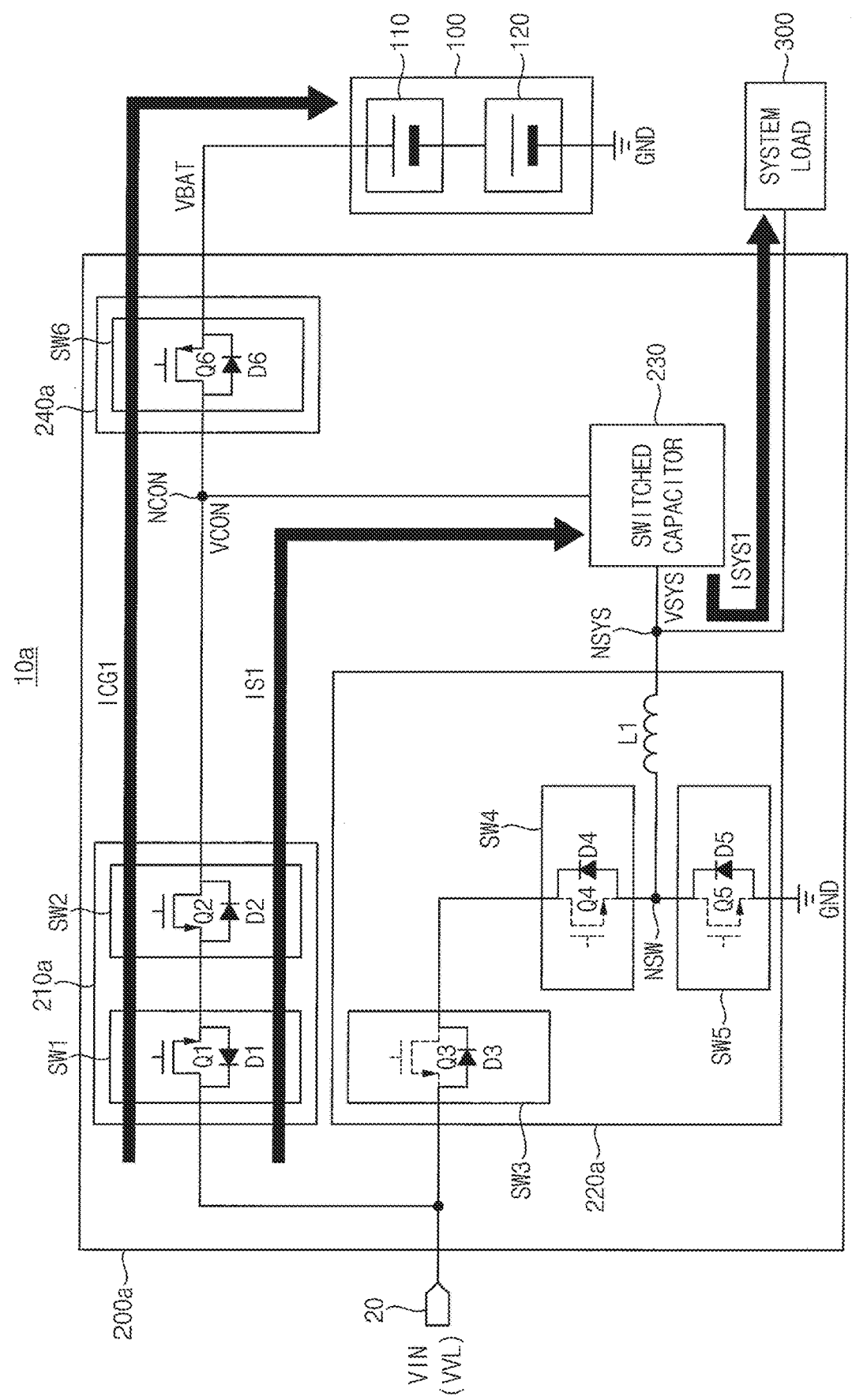
FIGS. 4A, 4B and 4C are diagrams for describing operations of a charger integrated circuit and an electronic device of FIG. 3.
Figure 4B:
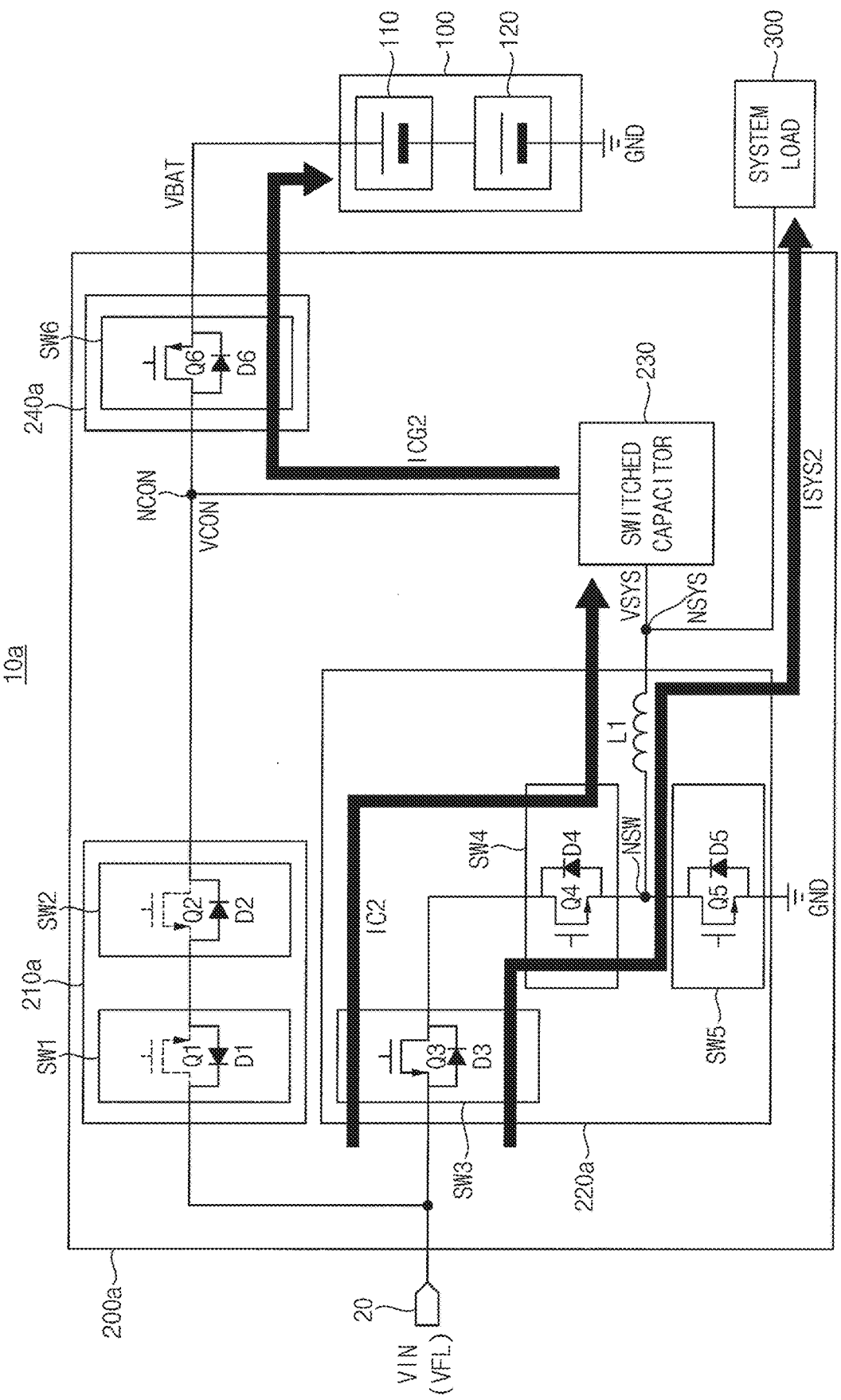
Figure 4C:
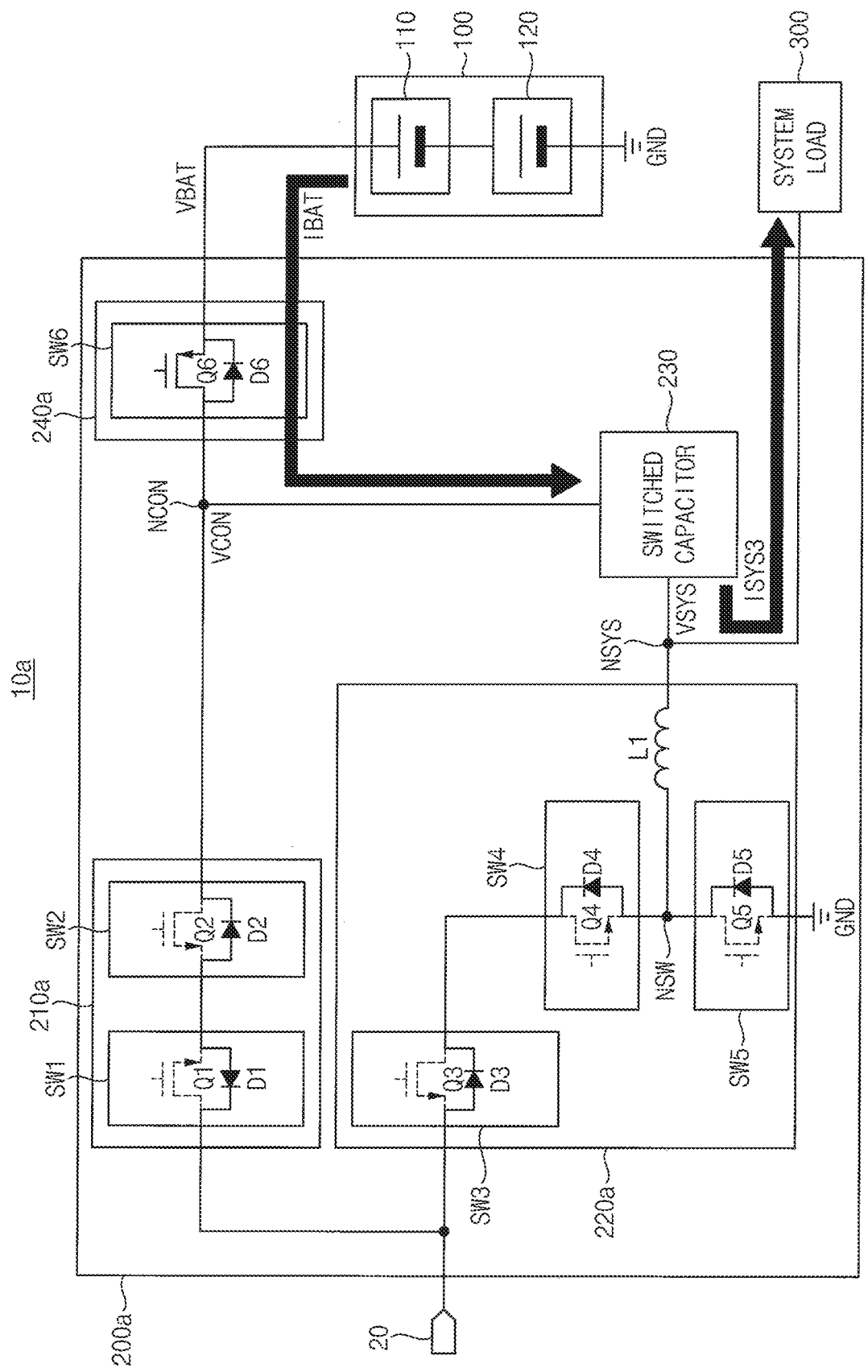

FIGS. 4A, 4B and 4C are diagrams for describing operations of a charger integrated circuit and an electronic device of FIG. 3. The descriptions repeated with FIGS. 2A, 2B and 2C will be omitted.

Referring to FIG. 4A, when the input voltage VIN is received from the input terminal 20, and when the input voltage VIN has the variable voltage level VVL, the direct charger 210a may be enabled, and the first and second transistors Q1 and Q2 included in the first and second switches SW1 and SW2 may be turned on. The buck converter 220a may be disabled, and the third, fourth and fifth transistors Q3, Q4 and Q5 included in the third, fourth and fifth switches SW3, SW4 and SW5 may be turned off. The switched capacitor 230 and the linear charger 240a may be enabled, and the sixth transistor Q6 included in the sixth switch SW6 may be turned on. The first charging current ICG1 may be supplied to the battery device 100 through the first, second and sixth transistors Q1, Q2 and Q6, and the first current IS1 may be provided to the switched capacitor 230 through the first and second transistors Q1 and Q2. The switched capacitor 230 may generate the first system current ISYS1 and the system voltage VSYS, and may supply the first system current ISYS1 and the system voltage VSYS to the system load 300.

Referring to FIG. 4B, when the input voltage VIN is received from the input terminal 20, and when the input voltage VIN has the fixed voltage level VFL, the buck converter 220a may be enabled, and the third, fourth and fifth transistors Q3, Q4 and Q5 included in the third, fourth and fifth switches SW3, SW4 and SW5 may be turned on. The direct charger 210a may be disabled, and the first and second transistors Q1 and Q2 included in the first and second switches SW1 and SW2 may be turned off. The switched capacitor 230 and the linear charger 240a may be enabled, and the sixth transistor Q6 included in the sixth switch SW6 may be turned on. The second current IC2 may be provided to the switched capacitor 230 through the third and fourth transistors Q3 and Q4 and the first inductor L1, and the second system current ISYS2 may be supplied to the system load 300 through the third and fourth transistors Q3 and Q4 and the first inductor L1. The switched capacitor 230 may generate the second charging current ICG2 and the control voltage VCON, and may supply the second charging current ICG2 and the control voltage VCON to the battery device 100 through the sixth transistor Q6.

Referring to FIG. 4C, when the input voltage VIN is not received from the input terminal 20, both the direct charger 210a and the buck converter 220a may be disabled, and all of the first to fifth transistors Q1, Q2, Q3, Q4 and Q5 may be turned off. The switched capacitor 230 and the linear charger 240a may be enabled, and the sixth transistor Q6 included in the sixth switch SW6 may be turned on. The battery current IBAT may be provided to the switched capacitor 230 through the sixth transistor Q6. The switched capacitor 230 may generate the third system current ISYS3 and the system voltage VSYS, and may supply the third system current ISYS3 and the system voltage VSYS to the system load 300.

Figure 5:
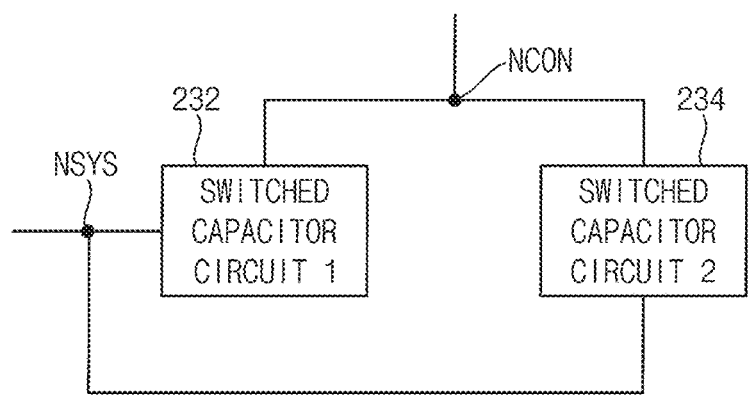
FIG. 5 is a block diagram illustrating an example embodiment of a switched capacitor included in a charger integrated circuit of FIGS. 1 and 3.

FIG. 5 is a block diagram illustrating an example embodiment of a switched capacitor included in a charger integrated circuit of FIGS. 1 and 3.

Referring to FIG. 5, a switched capacitor 230a may include a first switched capacitor circuit 232 and a second switched capacitor circuit 234.

The first switched capacitor circuit 232 and the second switched capacitor circuit 234 may be connected in parallel between the control node NCON and the system node NSYS. The first switched capacitor circuit 232 and the second switched capacitor circuit 234 may have the same or substantially the same configuration. A detailed configuration of the first switched capacitor circuit 232 will be described with reference to FIG. 6.

As described with reference to FIGS. 2A and 4A, when the input voltage VIN has the variable voltage level VVL, the control node NCON and the system node NSYS may correspond to an input terminal and an output terminal of the switched capacitor 230a, respectively. For example, the switched capacitor 230a may receive the first current IS1 through the control node NCON, may generate the first system current ISYS1 based on the first current IS1, and may output the first system current ISYS1 through the system node NSYS.

As described with reference to FIGS. 2B and 4B, when the input voltage VIN has the fixed voltage level VFL, the system node NSYS and the control node NCON may correspond to an input terminal and an output terminal of the switched capacitor 230a, respectively. For example, the switched capacitor 230a may receive the second current IC2 through the system node NSYS, may generate the second charging current ICG2 based on the second current IC2, and may output the second charging current ICG2 through the control node NCON.

Therefore, a direction of a current flowing through the switched capacitor 230a when the input voltage VIN has the variable voltage level VVL (e.g., a direction from the control node NCON to the system node NSYS) may be opposite to a direction of a current flowing through the switched capacitor 230a when the input voltage VIN has the fixed voltage level VFL (e.g., a direction from the system node NSYS to the control node NCON).

In some example embodiments, a voltage level of a voltage at the control node NCON may be about twice a voltage level of a voltage at the system node NSYS. For example, when the input voltage VIN has the variable voltage level VVL, a voltage obtained by reducing the control voltage VCON (or the battery voltage VBAT) to about half through the switched capacitor 230a may be generated as the system voltage VSYS. When the input voltage VIN has the fixed voltage level VFL, a voltage obtained by boosting the system voltage VSYS by about twice through the switched capacitor 230a may be generated as the control voltage VCON (or the battery voltage VBAT).

Figure 6:
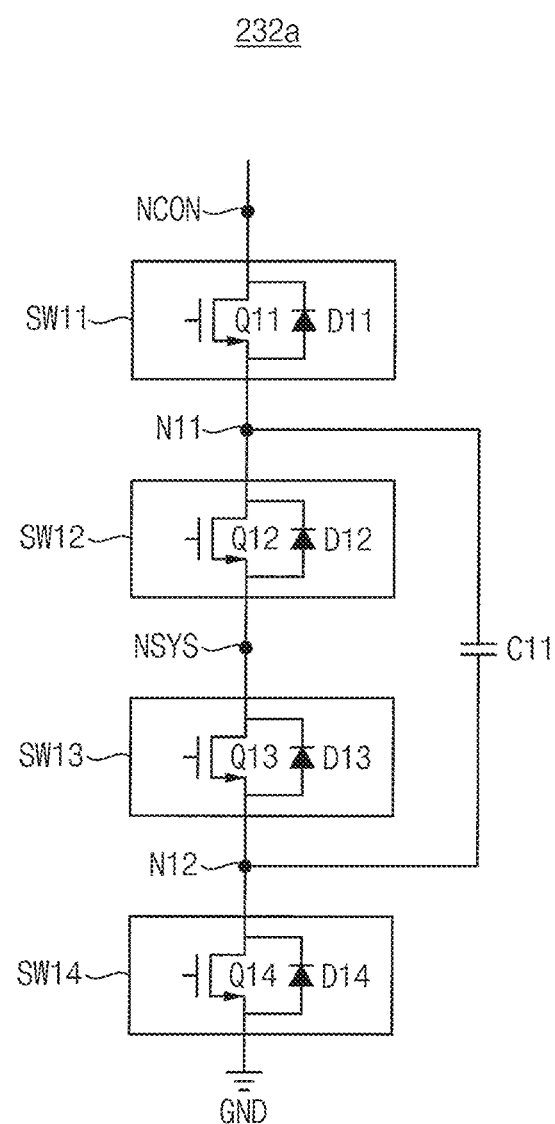
FIG. 6 is a circuit diagram illustrating an example embodiment of a first switched capacitor circuit included in a switched capacitor of FIG. 5.

FIG. 6 is a circuit diagram illustrating an example of a first switched capacitor circuit included in a switched capacitor of FIG. 5.

Referring to FIG. 6, a first switched capacitor circuit 232a may include a first switch SW11, a second switch SW12, a third switch SW13, a fourth switch SW14 and a first capacitor C11.

The first switch SW11 and the second switch SW12 may be connected in series between the control node NCON and the system node NSYS. The third switch SW13 and the fourth switch SW14 may be connected in series between the system node NSYS and the ground voltage GND. The first capacitor C11 may be connected between a first node N11 and a second node N12. The first node N11 may be a node between the first switch SW11 and the second switch SW12, and the second node N12 may be a node between the third switch SW13 and the fourth switch SW14.

In some example embodiments, each of the first switch SW11, the second switch SW12, the third switch SW13 and the fourth switch SW14 may include one transistor and one diode. For example, the first switch SW11 may include a first transistor Q11 and a first diode D11, the second switch SW12 may include a second transistor Q12 and a second diode D12, the third switch SW13 may include a third transistor Q13 and a third diode D13, and the fourth switch SW14 may include a fourth transistor Q14 and a fourth diode D14.

Each of the first transistor Q11, the second transistor Q12, the third transistor Q13 and the fourth transistor Q14 may be an NMOS transistor. For example, the first transistor Q11 may include a first electrode (e.g., a drain electrode) connected to the control node NCON, a second electrode (e.g., a source electrode) connected to the first node N11, and a control electrode (e.g., a gate electrode). The second transistor Q12 may include a first electrode (e.g., a drain electrode) connected to the first node N11, a second electrode (e.g., a source electrode) connected to the system node NSYS, and a control electrode (e.g., a gate electrode). The third transistor Q13 may include a first electrode (e.g., a drain electrode) connected to the system node NSYS, a second electrode (e.g., a source electrode) connected to the second node N12, and a control electrode (e.g., a gate electrode). The fourth transistor Q14 may include a first electrode (e.g., a drain electrode) connected to the second node N12, a second electrode (e.g., a source electrode) connected to the ground voltage GND, and a control electrode (e.g., a gate electrode). A control signal may be applied to the control electrode of each of the first to fourth transistors Q11, Q12, Q13 and Q14.

The first diode D11 may include a first electrode (e.g., a cathode electrode) connected to the first electrode of the first transistor Q11, and a second electrode (e.g., an anode electrode) connected to the second electrode of the first transistor Q11. The second diode D12 may include a first electrode (e.g., a cathode electrode) connected to the first electrode of the second transistor Q12, and a second electrode (e.g., an anode electrode) connected to the second electrode of the second transistor Q12. The third diode D13 may include a first electrode (e.g., a cathode electrode) connected to the first electrode of the third transistor Q13, and a second electrode (e.g., an anode electrode) connected to the second electrode of the third transistor Q13. The fourth diode D14 may include a first electrode (e.g., a cathode electrode) connected to the first electrode of the fourth transistor Q14, and a second electrode (e.g., an anode electrode) connected to the second electrode of the fourth transistor Q14. For example, the first to fourth diodes D1, D2, D3 and D4 may be parasitic diodes of the first to fourth transistors Q11, Q12, Q13 and Q14. Leakage currents may be inhibited or prevented by the first to fourth diodes D1, D2, D3 and D4 even when the first to fourth transistors Q11, Q12, Q13 and Q14 are turned off.

In some example embodiments, the first to fourth switches SW11, SW12, SW13 and SW14 and the first to fourth transistors Q11, Q12, Q13 and Q14 included therein may be driven by a control circuit.

Although not illustrated in detail, the second switched capacitor circuit 234 included in the switched capacitor 230a of FIG. 5 may have a configuration the same or substantially the same as that illustrated in FIG. 6.

Figure 7:
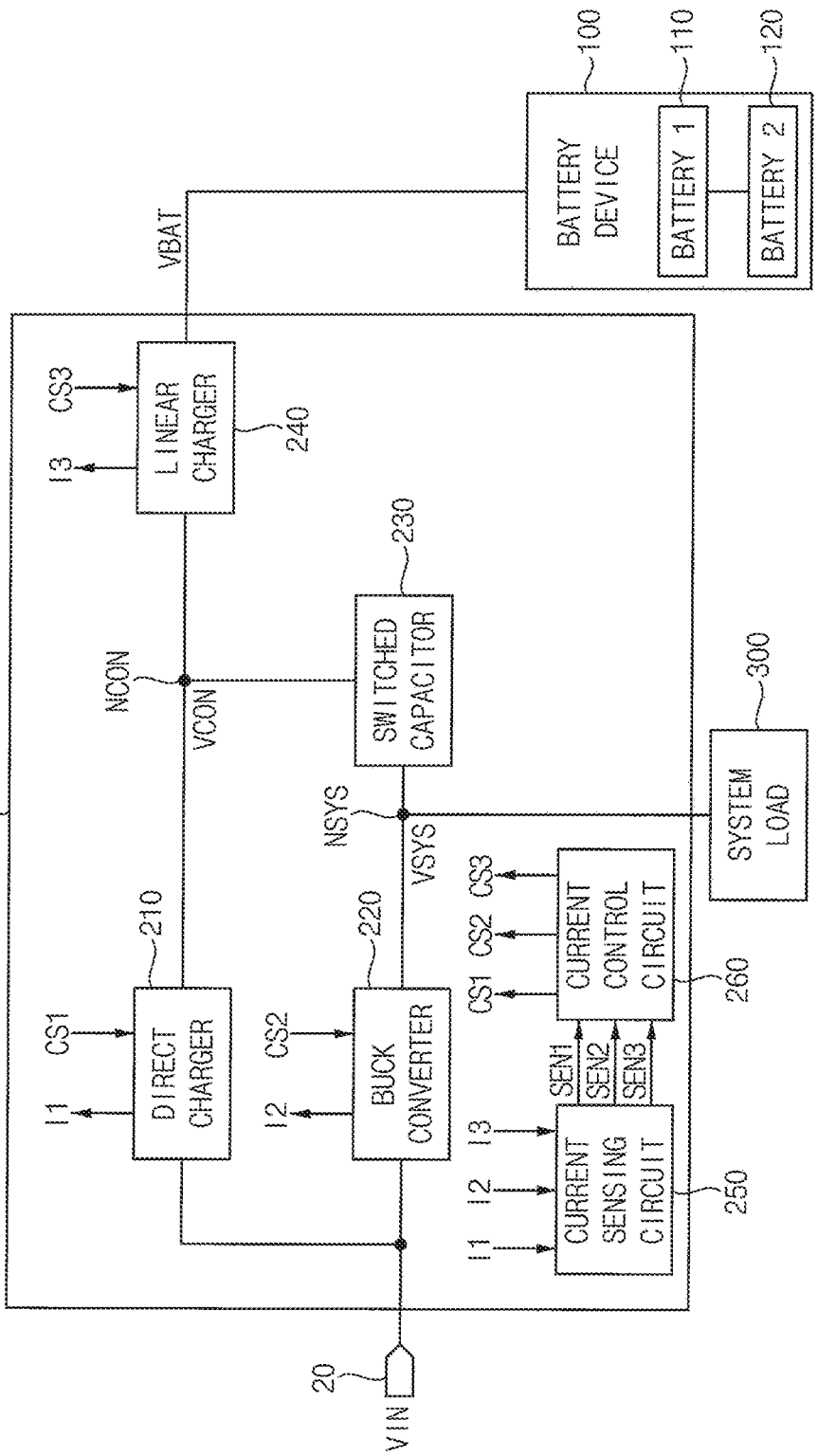
FIG. 7 is a block diagram illustrating a charger integrated circuit and an electronic device including the charger integrated circuit according to some example embodiments.

FIG. 7 is a block diagram illustrating a charger integrated circuit and an electronic device including the charger integrated circuit according to some example embodiments. The descriptions repeated with FIG. 1 will be omitted.

Referring to FIG. 7, an electronic device 12 includes a battery device 100, a charger integrated circuit 202 and a system load 300. The electronic device 12 may further include an input terminal 20. The charger integrated circuit 202 may include a direct charger 210, a buck converter 220, a switched capacitor 230 and a linear charger 240. The charger integrated circuit 202 may further includes a current sensing circuit 250 and a current control circuit 260.

The charger integrated circuit 202 and the electronic device 12 may be the same or substantially the same as the charger integrated circuit 200 and the electronic device 10 of FIG. 1, except that the charger integrated circuit 202 further includes the current sensing circuit 250 and the current control circuit 260.

The current sensing circuit 250 may generate a first sensing signal SEN1 by detecting or sensing a current I1 flowing through the direct charger 210, may generate a second sensing signal SEN2 by detecting or sensing a current I2 flowing through the buck converter 220, and may generate a third sensing signal SEN3 by detecting or sensing a current I3 flowing through the linear charger 240. For example, the current I1 may include the first charging current ICG1 and the first current IS1, the current I2 may include the second current IC2 and the second system current ISYS2, and the current I3 may include one of the first charging current ICG1, the second charging current ICG2 and the battery current IBAT.

The current control circuit 260 may generate a first current control signal CS1 for controlling the direct charger 210, a second current control signal CS2 for controlling the buck converter 220, and a third current control signal CS3 for controlling the linear charger 240. For example, the first, second and third current control signals CS1, CS2 and CS3 may be generated based on the first, second and third sensing signals SEN1, SEN2 and SEN3, respectively.

The direct charger 210 may perform a current control function based on the first current control signal CS1, the buck converter 220 may perform a current control function based on the second current control signal CS2, and the linear charger 240 may perform a current control function based on the third current control signal CS3.

Figure 8A:
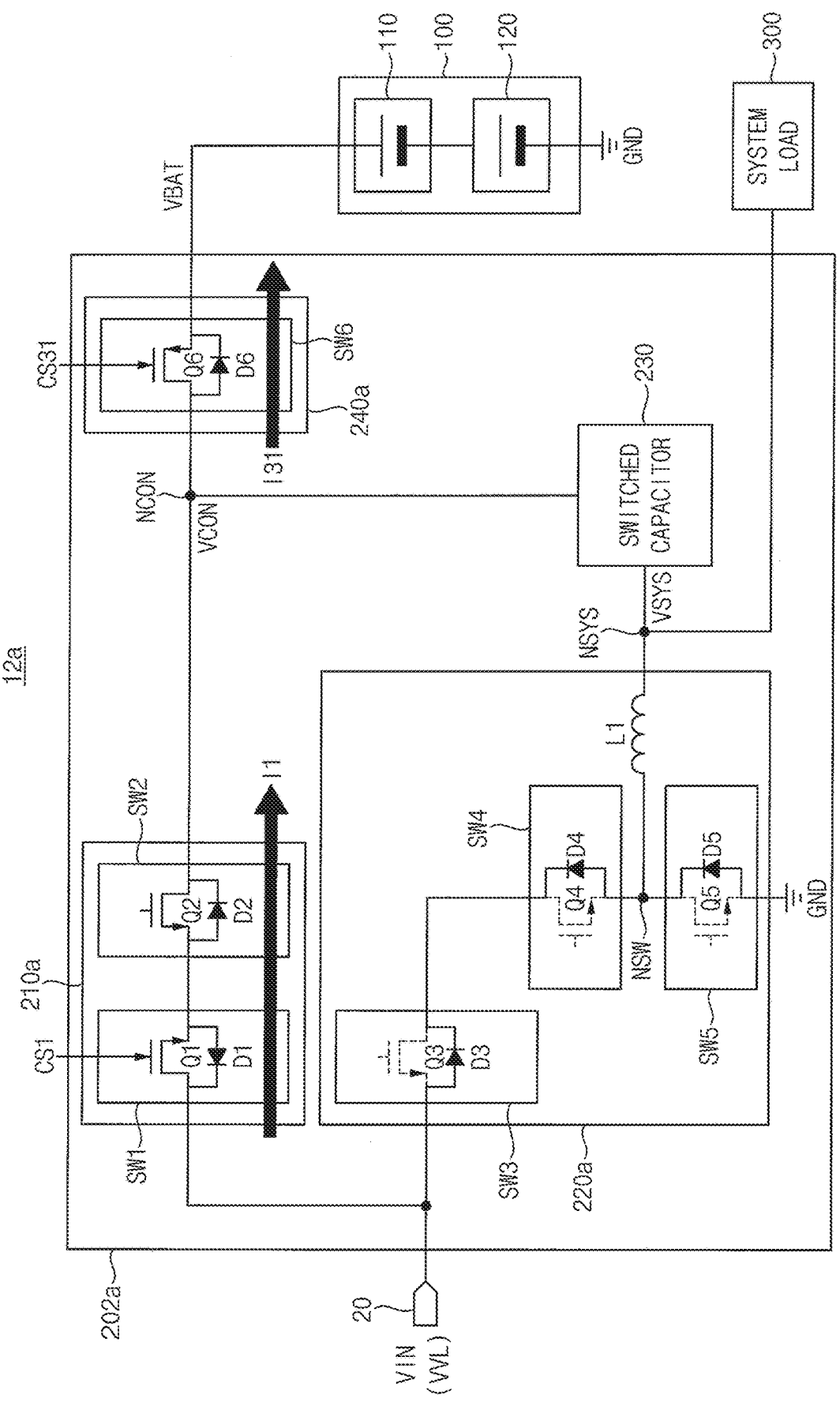
FIGS. 8A, 8B and 8C are diagrams illustrating an example of a charger integrated circuit and an electronic device of FIG. 7.
Figure 8B:
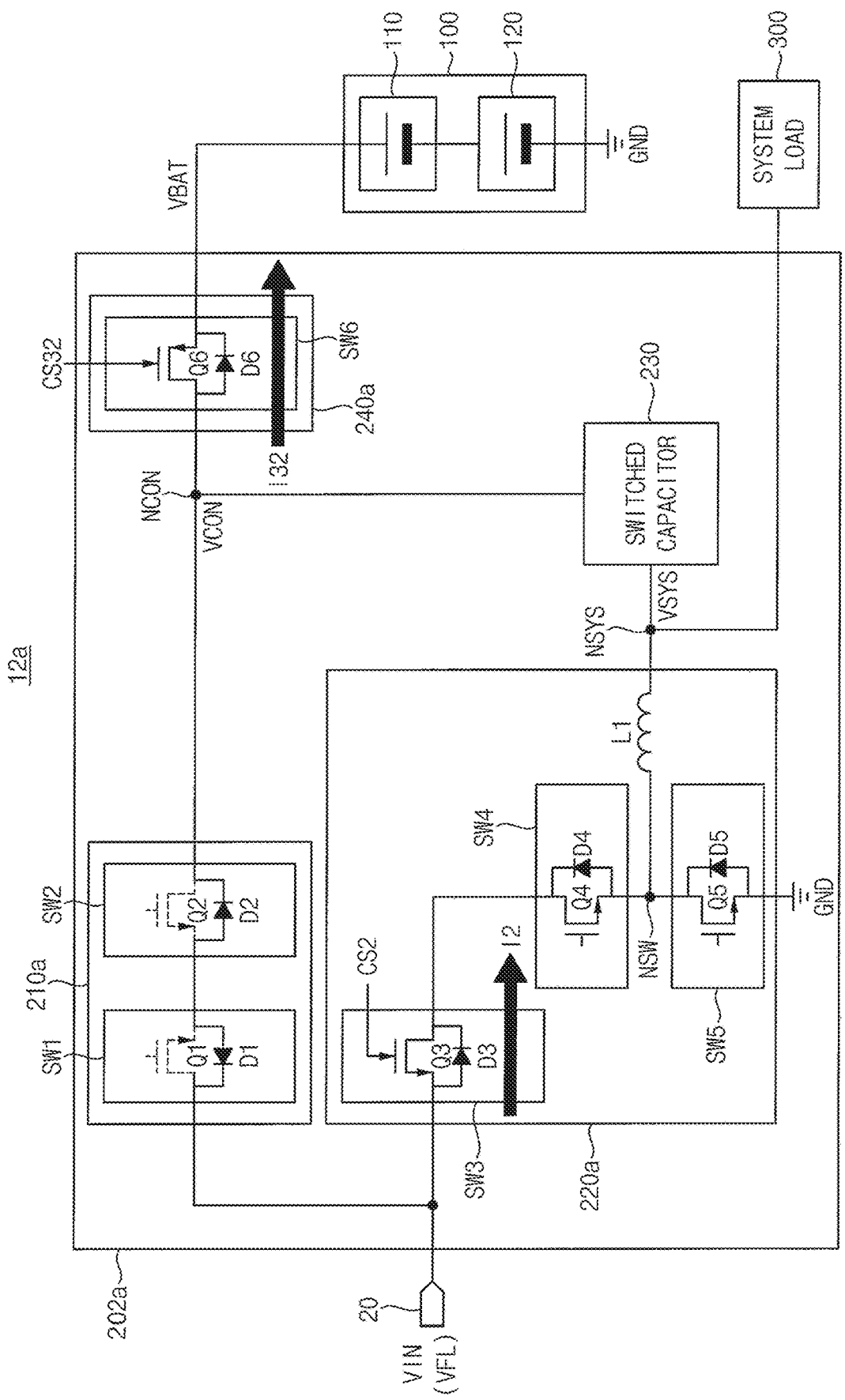
Figure 8C:
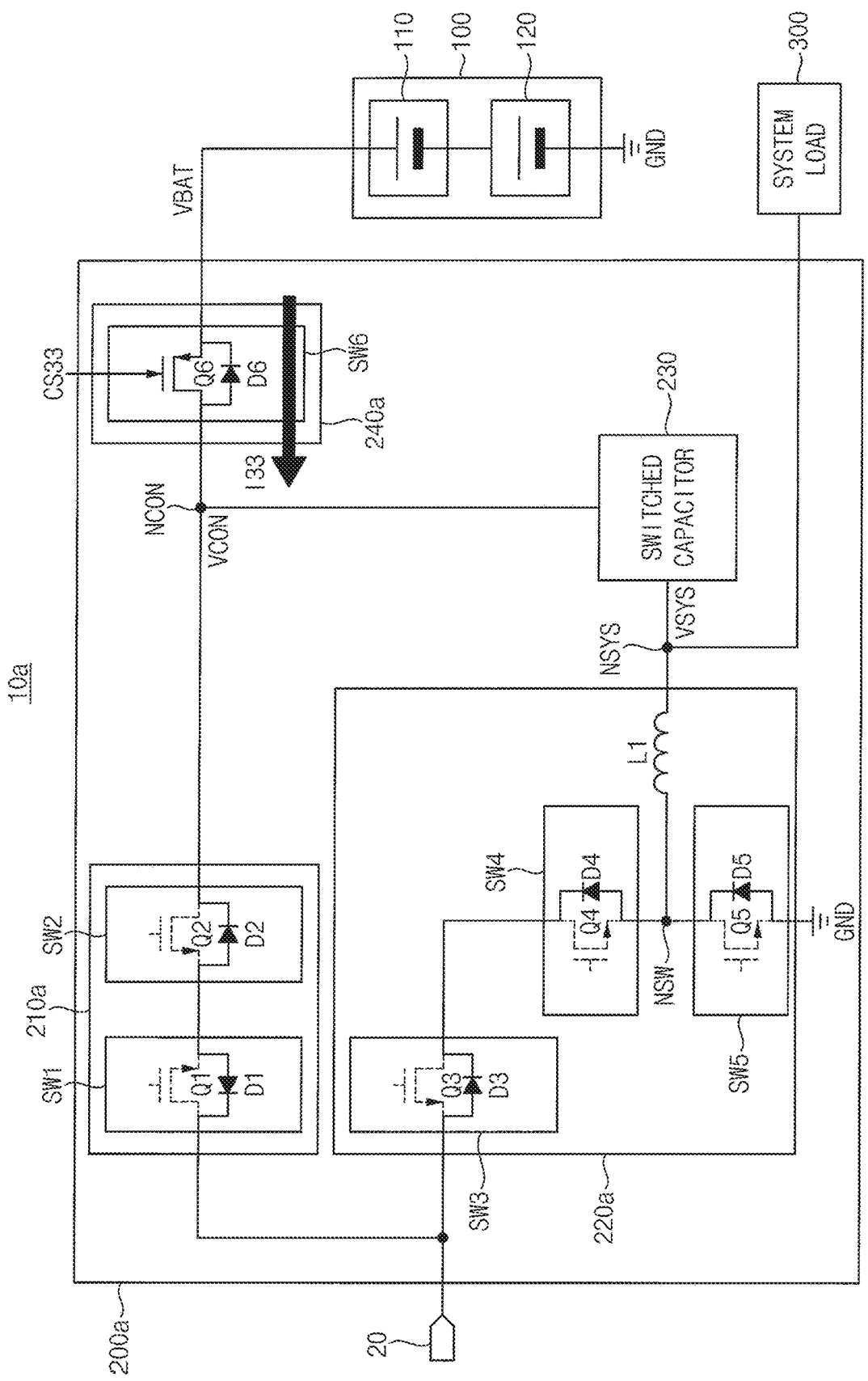

FIGS. 8A, 8B and 8C are diagrams illustrating an example embodiment of a charger integrated circuit and an electronic device of FIG. 7. The descriptions repeated with FIGS. 3, 4A, 4B, 4C and 7 will be omitted.

Referring to FIGS. 8A, 8B and 8C, an electronic device 12a includes a battery device 100, a charger integrated circuit 202a and a system load 300. The electronic device 12a may further include an input terminal 20. The charger integrated circuit 202a may include a direct charger 210a, a buck converter 220a, a switched capacitor 230 and a linear charger 240a. The charger integrated circuit 202a may further include the current sensing circuit 250 and the current control circuit 260 in FIG. 7. For convenience of illustration, the current sensing circuit 250 and the current control circuit 260 are omitted in FIGS. 8A, 8B and 8C.

As illustrated in FIG. 8A, when the input voltage VIN has the variable voltage level VVL, the first switch SW1, the first transistor Q1, the second switch SW2 and the second transistor Q2 that are included in the direct charger 210a may performs an input current control function (or an input current regulation), and the sixth switch SW6 and the sixth transistor Q6 that are included in the linear charger 240a may perform a charging current control function (or a charging current regulation).

For example, the current I1 flowing through the direct charger 210a (e.g., flowing through the first and second switches SW1 and SW2) may be sensed by the current sensing circuit 250, and the first current control signal CS1 generated by the current control circuit 260 may be applied to the control electrode (e.g., the gate electrode) of the first transistor Q1. When the current I1 exceeds a first reference value, the current I1 may be adjusted to be limited to less than or equal to the first reference value by changing a resistance of the first transistor Q1 based on the first current control signal CS1.

Similarly, a current I31 flowing through the linear charger 240a (e.g., flowing through the sixth switch SW6) may be sensed by the current sensing circuit 250, and a current control signal CS31 generated by the current control circuit 260 may be applied to the control electrode (e.g., the gate electrode) of the sixth transistor Q6. The current I31 and the current control signal CS31 may be included in the current I3 and the third current control signal CS3 in FIG. 7, respectively. When the current I31 exceeds a second reference value, the current I31 may be adjusted to be limited to less than or equal to the second reference value by changing a resistance of the sixth transistor Q6 based on the current control signal CS31. For example, the second reference value may be different from the first reference value.

In an example of FIG. 8A, the current I1 may correspond to the sum of the first charging current ICG1 and the first current IS1, and the current I31 may correspond to the first charging current ICG1. Thus, the first charging current ICG1 may be checked by sensing the current I31, and the first current IS1 (e.g., the first system current ISYS1) may be checked by sensing the currents I1 and I31 and by subtracting the current I31 from the current I1.

As illustrated in FIG. 8B, when the input voltage VIN has the fixed voltage level VFL, the third switch SW3 and the third transistor Q3 that are included in the buck converter 220a may perform an input current control function, and the sixth switch SW6 and the sixth transistor Q6 that are included in the linear charger 240a may perform a charging current control function.

For example, the current I2 flowing through the buck converter 220a (e.g., flowing through the third switch SW3) may be sensed by the current sensing circuit 250, and the second current control signal CS2 generated by the current control circuit 260 may be applied to the control electrode (e.g., the gate electrode) of the third transistor Q3. When the current I2 exceeds a third reference value, the current I2 may be adjusted to be limited to less than or equal to the third reference value by changing a resistance of the third transistor Q3 based on the second current control signal CS2. Alternatively, the current I2 may be adjusted to be limited to less than or equal to the third reference value by controlling the fourth transistor Q4 and the fifth transistor Q5. For example, the third reference value may be substantially equal to or different from the first reference value.

Similarly, a current I32 flowing through the linear charger 240a (e.g., flowing through the sixth switch SW6) may be sensed by the current sensing circuit 250, and a current control signal CS32 generated by the current control circuit 260 may be applied to the control electrode (e.g., the gate electrode) of the sixth transistor Q6. The current I32 and the current control signal CS32 may be included in the current I3 and the third current control signal CS3 in FIG. 7, respectively. When the current I32 exceeds a fourth reference value, the current I32 may be adjusted to be limited to less than or equal to the fourth reference value by changing the resistance of the sixth transistor Q6 based on the current control signal CS32. For example, the fourth reference value may be different from the third reference value, and may be substantially equal to or different from the second reference value.

In an example of FIG. 8B, the current I2 may correspond to the sum of the second current IC2 and the second charging current ICG2, and the current I32 may correspond to the second charging current ICG2. Thus, the second charging current ICG2 may be checked by sensing the current I32, and the second current IC2 (e.g., the second system current ISYS2) may be checked by sensing the currents I2 and I32 and by subtracting the current I32 from the current I2.

As illustrated in FIG. 8C, when the input voltage VIN is not received, the sixth switch SW6 and the sixth transistor Q6 that are included in the linear charger 240a may perform a charging current control function.

For example, the current I33 flowing through the linear charger 240a (e.g., flowing through the sixth switch SW6) may be sensed by the current sensing circuit 250, and a current control signal CS33 generated by the current control circuit 260 may be applied to the control electrode (e.g., the gate electrode) of the sixth transistor Q6. The current I33 and the current control signal CS33 may be included in the current I3 and the third current control signal CS3 in FIG. 7, respectively. When the current I33 exceeds a fifth reference value, the current I33 may be adjusted to be limited to less than or equal to the fifth reference value by changing the resistance value of the sixth transistor Q6 based on the current control signal CS33. For example, the fifth reference value may be equal or substantially equal to at least one of the second and fourth reference values or different from both the second and fourth reference values.

In an example of FIG. 8C, the current I33 may correspond to the battery current IBAT. Thus, the battery current IBAT may be checked by sensing the current I33.

Figure 9:
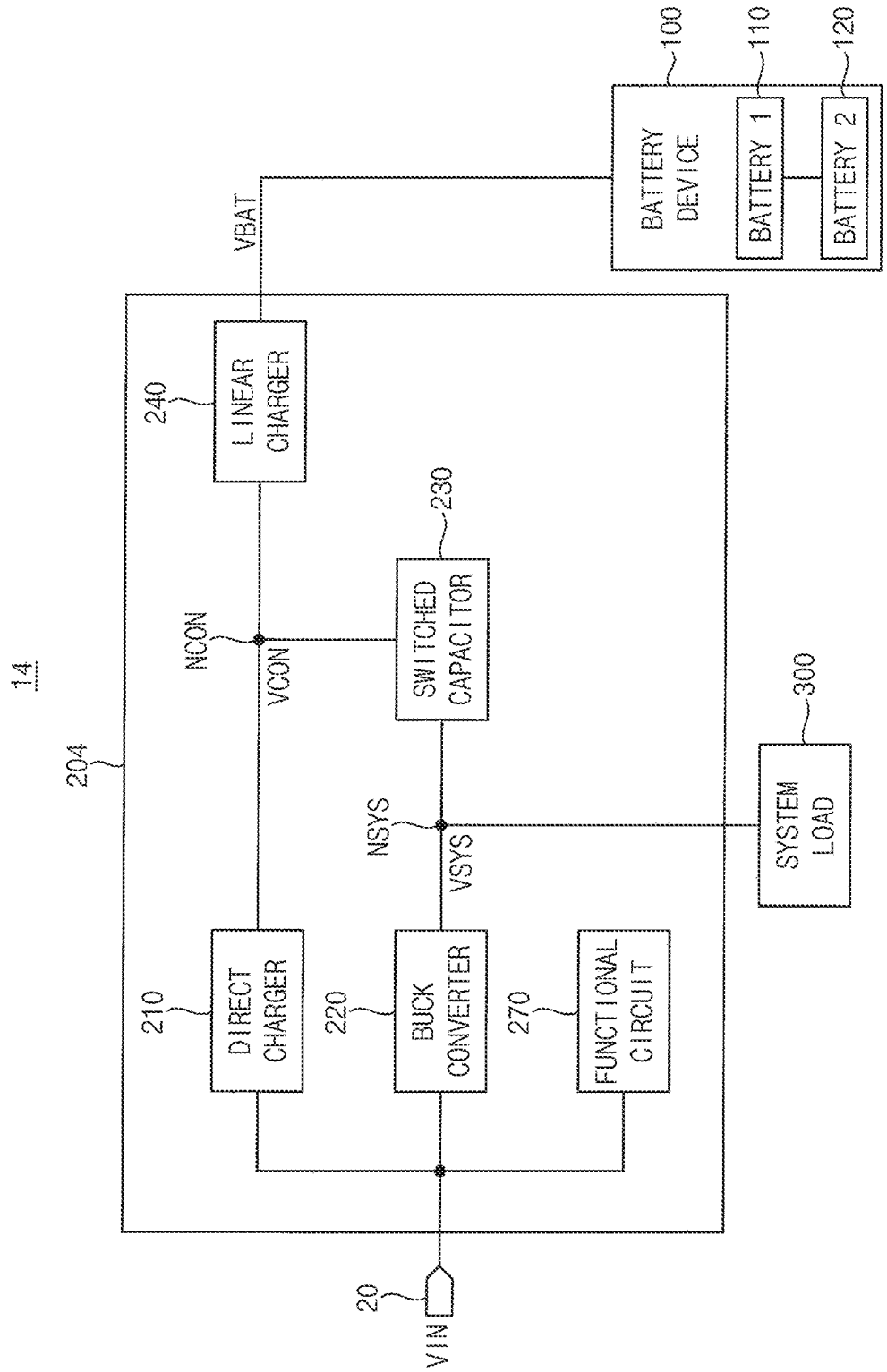
FIGS. 9 and 10 are block diagrams illustrating a charger integrated circuit and an electronic device including the charger integrated circuit according to some example embodiments.
Figure 10:
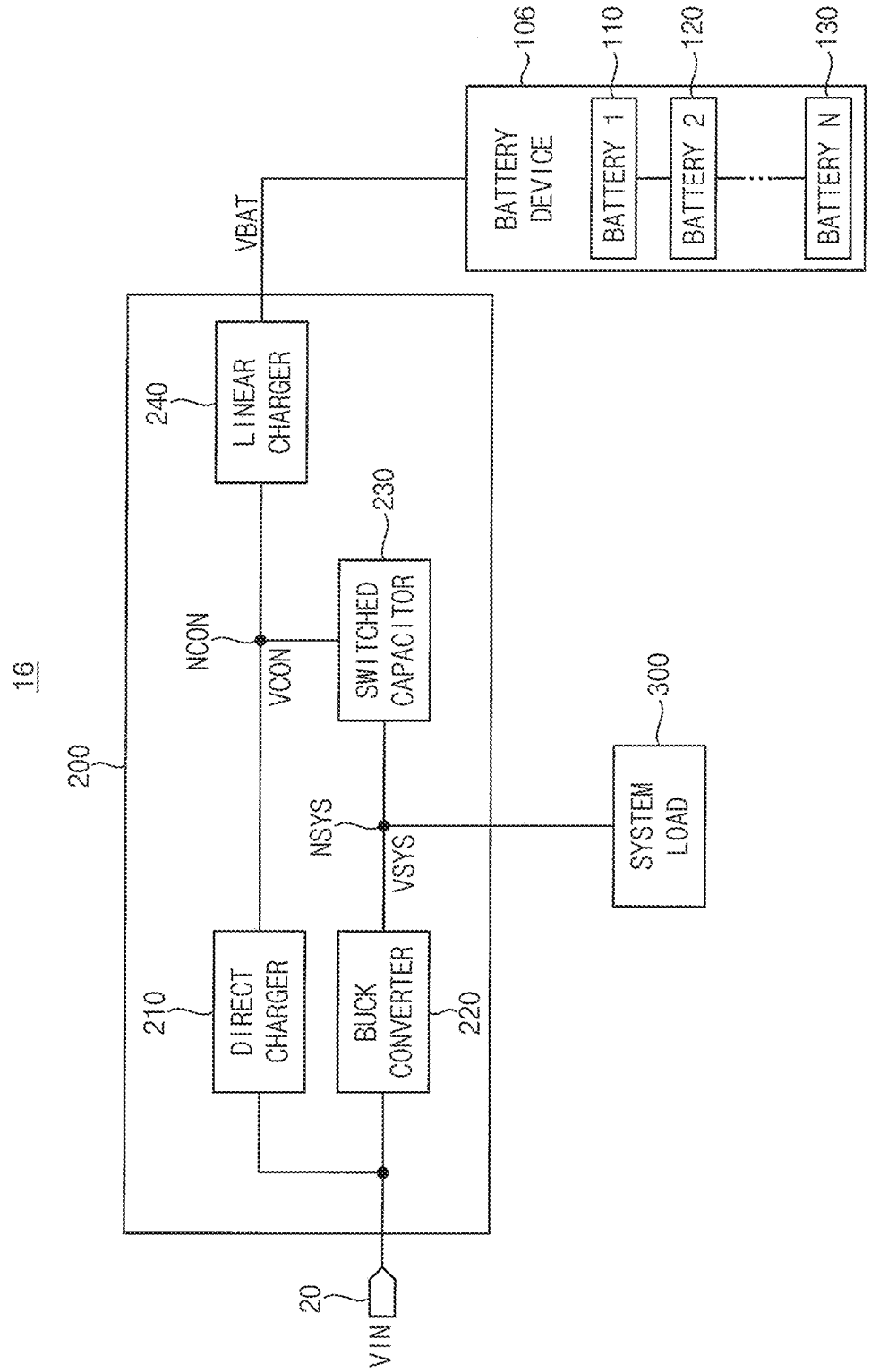

FIGS. 9 and 10 are block diagrams illustrating a charger integrated circuit and an electronic device including the charger integrated circuit according to some example embodiments. The descriptions repeated with FIG. 1 will be omitted.

Referring to FIG. 9, an electronic device 14 includes a battery device 100, a charger integrated circuit 204 and a system load 300. The electronic device 14 may further include an input terminal 20. The charger integrated circuit 204 may include a direct charger 210, a buck converter 220, a switched capacitor 230 and a linear charger 240. The charger integrated circuit 204 may further include a functional circuit 270.

The charger integrated circuit 204 and the electronic device 14 may be the same or substantially the same as the charger integrated circuit 200 and the electronic device 10 of FIG. 1, except that the charger integrated circuit 204 further includes the functional circuit 270.

The functional circuit 270 may be connected to the input terminal 20. The functional circuit 270 may include a circuit or block supporting one or more additional functions, such as an under-voltage lockout (UVLO) function, an over-current protection (OCP) function, an over-voltage protection (OVP) function, a soft-start function reducing in-rush current, a foldback current limit function, a hiccup mode function for short circuit protection, and an over-temperature protection (OTP) function, etc., but example embodiments are not limited thereto These optionally provided function(s) allow the charger integrated circuit 204 to operate properly under a variety of conditions (e.g., power saving conditions, environmental conditions, etc.).

Referring to FIG. 10, an electronic device 16 includes a battery device 106, a charger integrated circuit 200 and a system load 300. The electronic device 16 may further include an input terminal 20. The charger integrated circuit 200 may include a direct charger 210, a buck converter 220, a switched capacitor 230 and a linear charger 240.

The electronic device 16 may be substantially the same as the electronic device 10 of FIG. 1, except that a configuration of the battery device 106 is partially changed.

The battery device 106 may include first to N-th batteries 110, 120 and 130 that are connected in series, where N is a natural number greater than or equal to three.

In some example embodiments, two or more of the examples of FIGS. 7, 9 and 10 may be combined. For example, the electronic device 12 and the charger integrated circuit 202 of FIG. 7 may further include at least one of the functional circuit 270 in FIG. 9 and the battery device 106 in FIG. 10.

Figure 11:
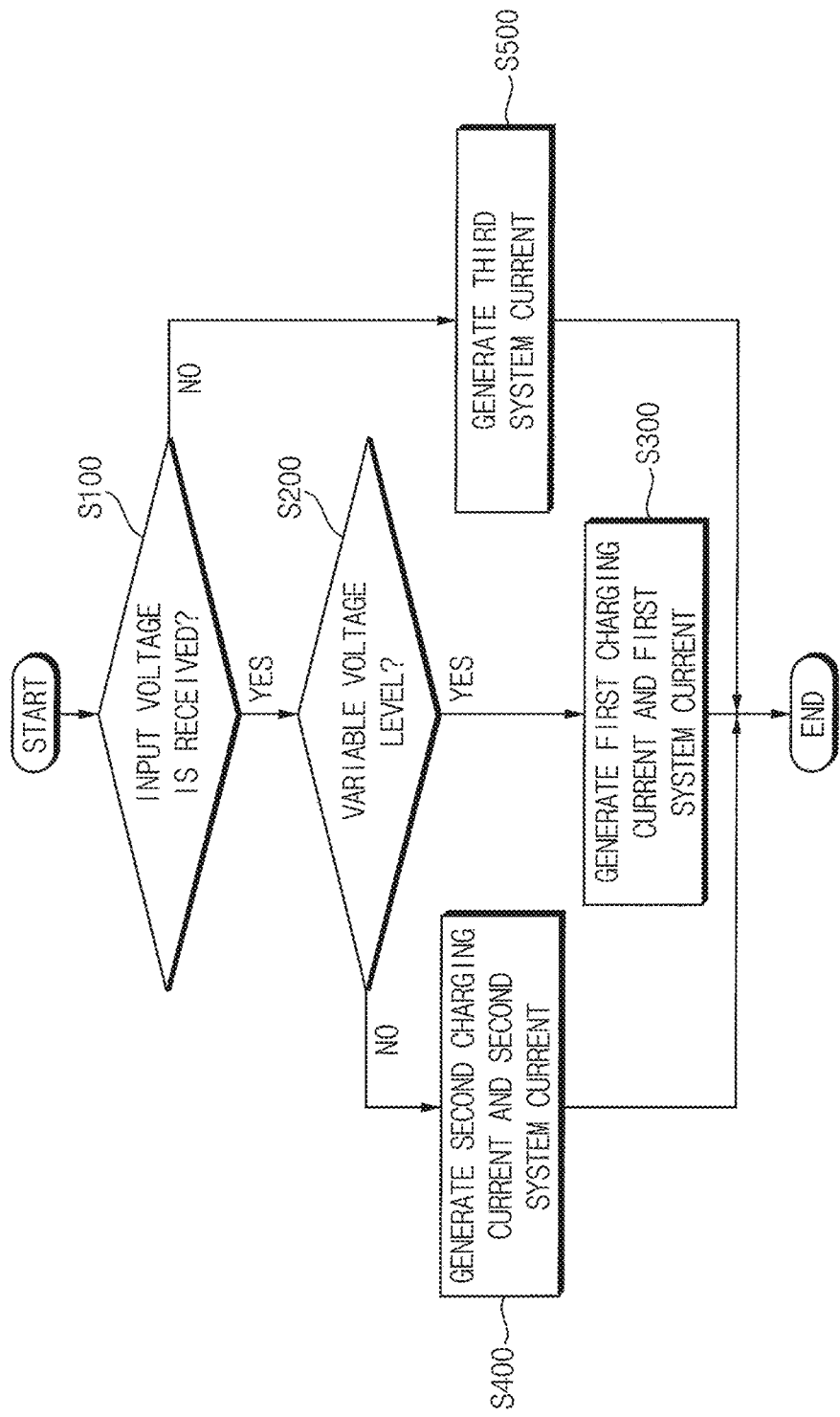
FIG. 11 is a flowchart illustrating a method of operating a charger integrated circuit according to some example embodiments.

FIG. 11 is a flowchart illustrating a method of operating a charger integrated circuit according to some example embodiments.

Referring to FIGS. 1, 2A, 2B, 2C and 11, in a method of operating a charger integrated circuit according to some example embodiments, it is checked whether the input voltage VIN is received from the input terminal 20 (step S100). When the input voltage VIN is received from the input terminal 20 (step S100: YES), it is checked or identified whether the input voltage VIN has the variable voltage level VVL or the fixed voltage level VFL (step S200).

When the input voltage VIN is received from the input terminal 20 (step S100: YES), and when the input voltage VIN has the variable voltage level VVL (step S200: YES), the first charging current ICG1 and the first system current ISYS1 are generated using the direct charger 210 and the switched capacitor 230 (step S300).

When the input voltage VIN is received from the input terminal 20 (step S100: YES), and when the input voltage VIN does not have a variable voltage level VVL (e.g., when the input voltage VIN has the fixed voltage level VFL) (step S200: NO), the second charging current ICG2 and the second system current ISYS2 are generated using the buck converter 220 and the switched capacitor 230 (step S400).

When the input voltage VIN is not received from the input terminal 20 (step S100: NO), the third system current ISYS3 is generated using the switched capacitor 230 (step S500).

Figure 12:
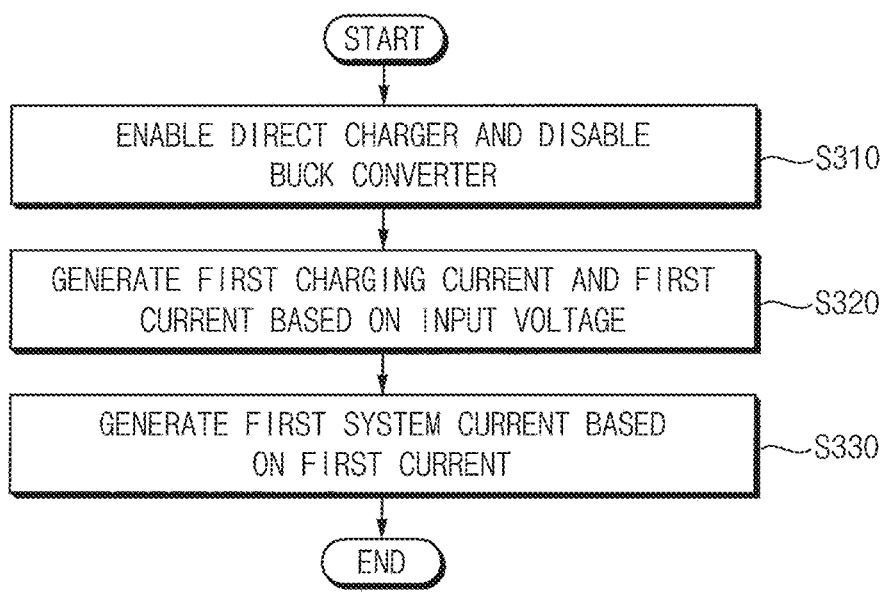
FIG. 12 is a flowchart illustrating an example embodiment of generating a first charging current and a first system current in FIG. 11.

FIG. 12 is a flowchart illustrating an example embodiment of generating a first charging current and a first system current in FIG. 11.

Referring to FIGS. 2A, 11 and 12, when generating the first charging current ICG1 and the first system current ISYS1 (step S300), the direct charger 210 may be enabled and the buck converter 220 may be disabled (step S310). The direct charger 210 may generate the first charging current ICG1 and the first current IS1 based on the input voltage VIN (step S320). The first charging current ICG1 may be supplied to the battery device 100 through the linear charger 240. The switched capacitor 230 may generate the first system current ISYS1 based on the first current IS1 (step S330). The first system current ISYS1 may be supplied to the system load 300.

Figure 13:
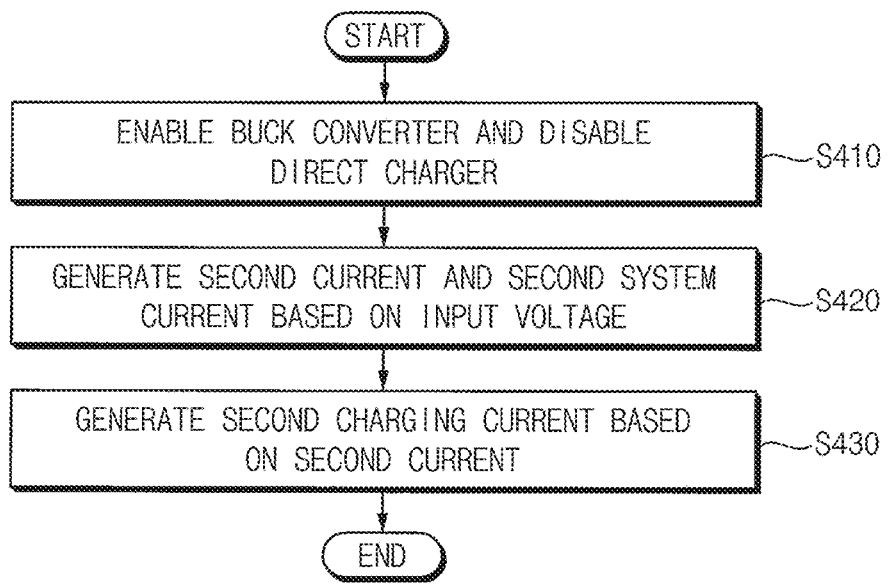
FIG. 13 is a flowchart illustrating an example embodiment of generating a second charging current and a second system current in FIG. 11.

FIG. 13 is a flowchart illustrating an example embodiment of generating a second charging current and a second system current in FIG. 11.

Referring to FIGS. 2B, 11 and 13, when generating the second charging current ICG2 and the second system current ISYS2 (step S400), the buck converter 220 may be enabled and the direct charger 210 may be disabled (step S410). The buck converter 220 may generate the second current IC2 and the second system current ISYS2 based on the input voltage VIN (step S420). The second system current ISYS2 may be supplied to the system load 300. The switched capacitor 230 may generate the second charging current ICG2 based on the second current IC2 (step S430). The second charging current ICG2 may be supplied to the battery device 100 through the linear charger 240.

Figure 14:
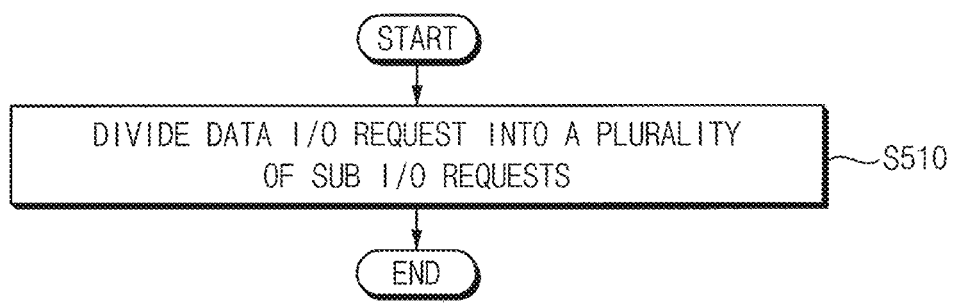
FIG. 14 is a flowchart illustrating an example embodiment of generating a third system current in FIG. 11.

FIG. 14 is a flowchart illustrating an example embodiment of generating a third system current in FIG. 11.

Referring to FIGS. 2C, 11 and 14, when generating the third system current ISYS3 (step S500), the switched capacitor 230 may generate the third system current ISYS3 based on the battery current IBAT supplied from the battery device 100 (step S510). The third system current ISYS3 may be supplied to the system load 300. While step S510 is performed, both the direct charger 210 and the buck converter 220 may be disabled.

Figure 15:
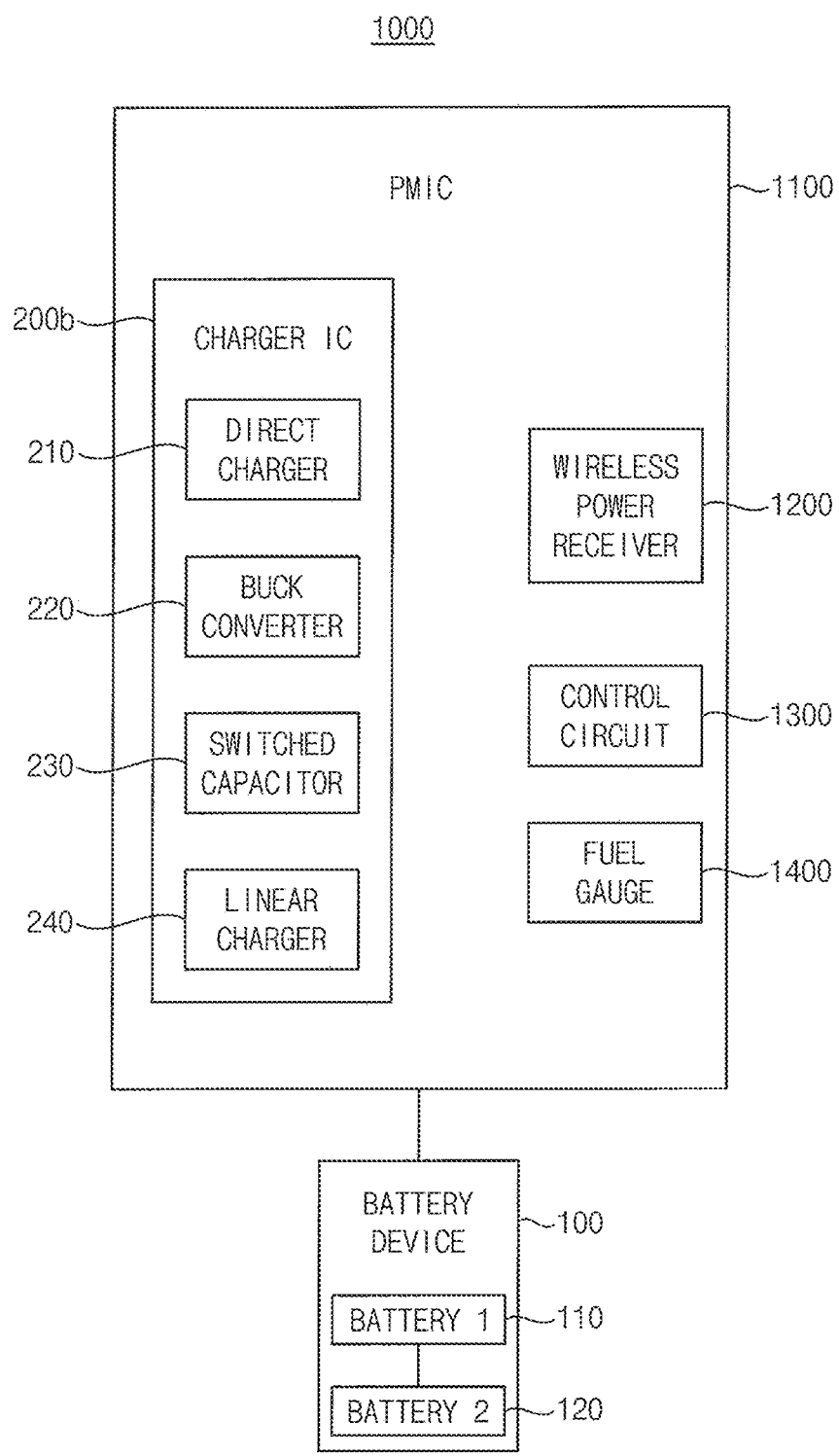
FIGS. 15 and 16 are block diagrams illustrating an electronic device according to some example embodiments.
Figure 16:
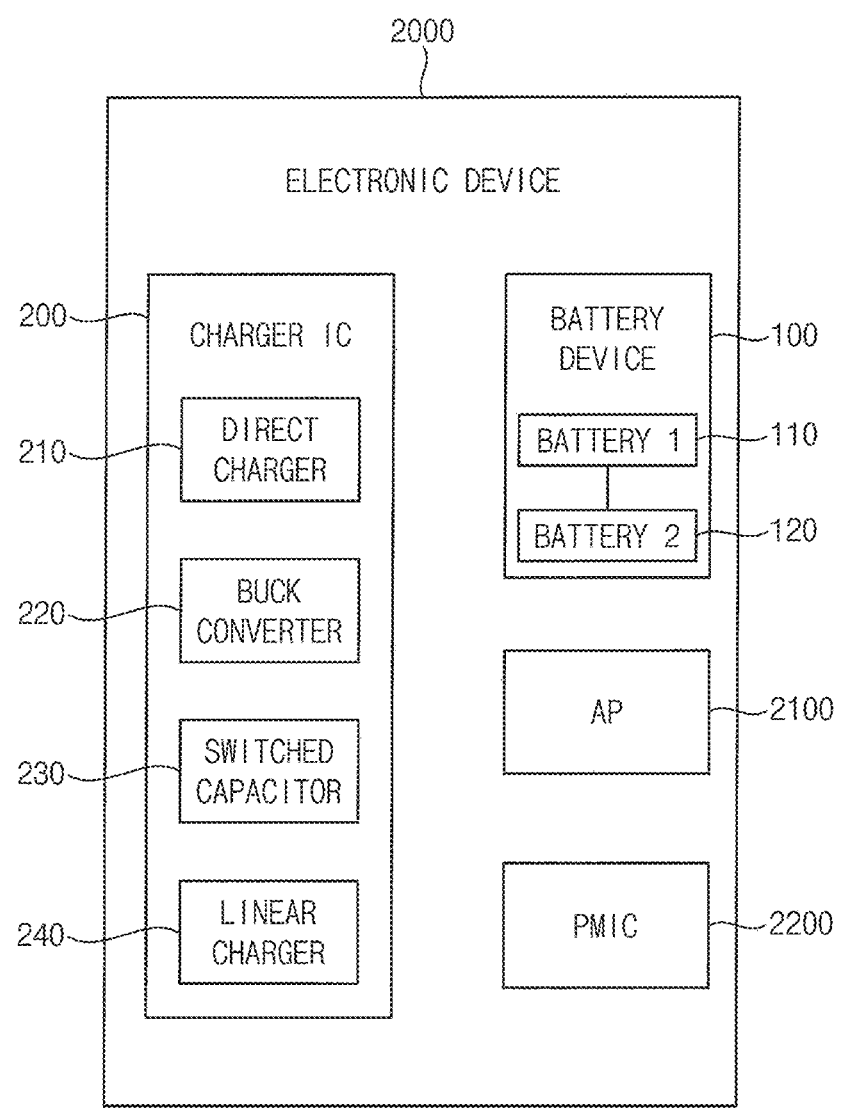

FIGS. 15 and 16 are block diagrams illustrating an electronic device according to some example embodiments.

Referring to FIG. 15, an electronic device 1000 may include a power management integrated circuit (PMIC) 1100, and a battery device 100 may be attached to the electronic device 1000. The power management integrated circuit 1100 may include a charger integrated circuit 200b, a wireless power receiver 1200, a control circuit 1300 and a fuel gauge 1400. Although not illustrated in FIG. 15, the power management integrated circuit 1100 may further include a light emitting diode (LED) driver, a universal serial bus (USB) type-C circuit, or the like.

The battery device 100 and the charger integrated circuit 200b may be the same or substantially the same as the battery device 100 and the charger integrated circuit 200 in FIG. 1, respectively. The charger integrated circuit 200b may be implemented according to some example embodiments. In the charger integrated circuit 200b, the number of circuits, the number of transistors and the circuit area may be reduced as compared to a conventional charger integrated circuit, and a charging scheme for stably supplying the system voltage VSYS while charging the high battery voltage VBAT of the battery device 100 including the batteries 110 and 120 connected in series may be efficiently implemented.

In some example embodiments, the charger integrated circuit 200b may support a wired charging mode and a wireless charging mode. In the wired charging mode, the charger integrated circuit 200b may receive the input voltage VIN from an output terminal of a travel adapter through the input terminal 20. In the wireless charging mode, the direct charger 210 may be disabled, and the charger integrated circuit 200b may receive wireless power from the wireless power receiver 1200. The wireless power receiver 1200 may generate power using one of various wireless charging schemes, such as magnetic induction, magnetic resonance, electromagnetic induction, and non-radiative wireless charging (WiTricity), but example embodiments are not limited thereto. For example, the wireless power receiver 1200 may include a wireless rectifier.

In some example embodiments, the wireless power receiver 1200 may be implemented as a dual-purpose unit for both wireless charging and magnetic secure transmission (MST). As a result, the charger integrated circuit 200b may further support an MST mode, where MST is a technique by which, when the electronic device 1000 containing credit card information is brought into direct or indirect contact with a credit card payment terminal (e.g., a point-of-sale (POS) terminal), the credit card payment terminal performs a payment process by automatically loading the credit card information contained in the electronic device 1000. Using a MST technique, the credit card information may be transferred to the credit card payment terminal using electromagnetic signal(s). While operating in the MST mode, the direct charger 210 may be disabled, and the charger integrated circuit 200b may be electrically connected to the wireless power receiver 1200.

The control circuit 1300 may control an operation of the charger integrated circuit 200b. For example, the control circuit 1300 may drive switches or transistors included in the charger integrated circuit 200b depending on the operation modes (e.g., the high-speed charging mode, the normal charging mode or the discharging mode). In addition, the control circuit 1300 may control the voltage level of the input voltage VIN applied to the charger integrated circuit 200b. However, example embodiments are not limited thereto, and the functions of the control circuit 1300 may be performed by a micro-controller unit (MCU), and the micro-controller unit may be disposed outside the power management integrated circuit 1100.

The fuel gauge 1400 may monitor the residual quantity, voltage, current, temperature, or the like of the battery device 100. The fuel gauge 1400 may be referred to as a battery gauge. In some example embodiments, the fuel gauge 1400 may be connected to at least one sensing resistor, which is connected to at least one of the first and second batteries 110 and 120 included in the battery device 100, and thus may monitor a battery current flowing through at least one of the first and second batteries 110 and 120. However, example embodiments are not limited thereto, and the fuel gauge 1400 may be disposed outside the power management integrated circuit 1100 or may be included in the battery device 100.

Referring to FIG. 16, an electronic device 2000 may include a battery device 100, a charger integrated circuit 200, an application processor (AP) 2100 and a power management integrated circuit 2200. The electronic device 2000 may include the charger integrated circuit 200 for receiving power supplied from outside the electronic device 2000 and for charging the battery device 100.

The battery device 100 and the charger integrated circuit 200 may be the same or substantially the same as the battery device 100 and the charger integrated circuit 200 in FIG. 1, respectively. The charger integrated circuit 200 may be implemented according to some example embodiments. In the charger integrated circuit 200, the number of circuits, the number of transistors and the circuit area may be reduced as compared to a conventional charger integrated circuit, and a charging scheme for stably supplying the system voltage VSYS while charging the high battery voltage VBAT of the battery device 100 including the batteries 110 and 120 connected in series may be efficiently implemented.

The application processor 2100 may control overall operations of the electronic device 2000. In some example embodiments, the application processor 2100 may control the charger integrated circuit 200, for example, may control the charger integrated circuit 200 in the high-speed charging mode, the normal charging mode or the discharging mode. In some example embodiments, when the electronic device 2000 is connected to a travel adapter, the application processor 2100 may adjust the input voltage VIN provided by the travel adapter by communicating (wirelessly or wired) with the travel adapter.

In some example embodiments, the application processor 2100 may be implemented as a system-on-chip (SoC) including one or more functional modules or intellectual properties (IPs). For example, the application processor 2100 may include a communication module that performs a communication function (e.g., a code division multiple access (CDMA) module, a long term evolution (LTE) module, a fifth-generation (5G) module, a radio frequency (RF) module, an ultra wideband (UWB) module, a wireless local area network (WLAN) module, a worldwide interoperability for a microwave access (WIMAX) module, etc.), a camera module that performs a camera function, a display module that performs a display function, a touch panel module that performs a touch sensing function, etc., but example embodiments are not limited thereto. In some example embodiments, the application processor 2100 may further include a global positioning system (GPS) module, a microphone (MIC) module, a speaker module, a gyroscope module, etc. However, the functional modules included in the application processor 2100 are not limited thereto.

The power management integrated circuit 2200 may receive a battery voltage, and may manage power required to drive the application processor 2100. In addition, the power management integrated circuit 2200 may be implemented to generate or manage voltages required for internal components of the electronic device 2000. In some example embodiments, the electronic device 2000 may include a plurality of power management integrated circuits including the power management integrated circuit 2200. In some example embodiments, the power management integrated circuit 2200 may receive the battery voltage from the battery device 100, may receive a system voltage through the charger integrated circuit 200, and/or may directly receive the input voltage VIN.

The inventive concepts may be applied to various electronic devices and systems that include the charger integrated circuits and the battery devices. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc., but example embodiments are not limited thereto.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

The foregoing is illustrative of some example embodiments and is not to be construed as limiting thereof. Although some example embodiments have been described, many modifications are possible in the example embodiments without materially departing from novel teachings and advantages of the example embodiments. Accordingly, all such modifications are intended to be included within the scope of various example embodiments. Therefore, it is to be understood that the foregoing is illustrative of various example embodiments and is not to be construed as limited to specific example embodiments disclosed, and that modifications to the disclosed example embodiments, as well as other example embodiments, are intended to be included within the scope of the inventive concepts.

What is claimed is:

1. A charger integrated circuit configured to charge a battery device including a first battery and a second battery connected in series, the charger integrated circuit comprising:
   a direct charger configured to generate a first charging current and a first current based on an input voltage received from an input terminal, the first charging current used to charge the battery device, the first current used to generate a first system current, and the first system current provided to a system load;
   a buck converter configured to generate a second current and a second system current based on the input voltage, the second current used to generate a second charging current, the second charging current used to charge the battery device, and the second system current provided to the system load;
   a switched capacitor configured to generate the first system current based on the first current, and to generate the second charging current based on the second current; and
   a linear charger configured to provide the first charging current and the second charging current to the battery device.

2. The charger integrated circuit of claim 1, wherein, in response to the input voltage having a variable voltage level, the direct charger is configured to enable to generate the first charging current and the first current based on the input voltage, the buck converter is configured to disable, and the switched capacitor is configured to generate the first system current based on the first current.

3. The charger integrated circuit of claim 1, wherein, in response to the input voltage having a fixed voltage level, the buck converter is configured to enable to generate the second current and the second system current based on the input voltage, the direct charger is configured to disable, and the switched capacitor is configured to generate the second charging current based on the second current.

4. The charger integrated circuit of claim 1, wherein the buck converter includes:
   a first switch, a second switch and a third switch connected in series between the input terminal and a ground voltage; and
   a first inductor connected between a switching node and a system node, the switching node between the second switch and the third switch, and the system node connected to the system load.

5. The charger integrated circuit of claim 4, wherein the first switch is configured to implement a current control function for the second current and the second system current.

6. The charger integrated circuit of claim 1, wherein the switched capacitor includes:
   a first switched capacitor circuit and a second switched capacitor circuit connected in parallel between a control node and a system node, the control node connected to the direct charger and the linear charger, and the system node connected to the system load.

7. The charger integrated circuit of claim 6, wherein the first switched capacitor circuit includes:
   a first switch and a second switch connected in series between the control node and the system node;
   a third switch and a fourth switch connected in series between the system node and a ground voltage; and a first capacitor connected between a first node and a second node, the first node between the first switch and the second switch, and the second node between the third switch and the fourth switch.

8. The charger integrated circuit of claim 6, wherein:

in response to the input voltage having a variable voltage level, the switched capacitor is configured to receive the first current through the control node, to generate the first system current based on the first current, and to output the first system current through the system node, and in response to the input voltage having a fixed voltage level, the switched capacitor is configured to receive the second current through the system node, to generate the second charging current based on the second current, and to output the second charging current through the control node.

9. The charger integrated circuit of claim 8, wherein a direction of a current flowing through the switched capacitor in response to the input voltage having the variable voltage level is opposite to a direction of a current flowing through the switched capacitor in response to the input voltage having the fixed voltage level.

10. The charger integrated circuit of claim 6, wherein a voltage level of a voltage at the control node is double a voltage level of a voltage at the system node.

11. The charger integrated circuit of claim 1, wherein the direct charger includes:

a first switch and a second switch connected in series between the input terminal and a control node, the control node connected to the switched capacitor and the linear charger.

12. The charger integrated circuit of claim 11, wherein the first switch is configured to implement a current control function for the first charging current and the first current.

13. The charger integrated circuit of claim 1, wherein the linear charger includes:

a first switch connected between a control node and the battery device, the control node connected to the direct charger and the switched capacitor.

14. The charger integrated circuit of claim 13, wherein the first switch is configured to implement a current control function for the first charging current and the second charging current.

15. The charger integrated circuit of claim 1, wherein a number of transistors included in the direct charger, the buck converter and the linear charger is six.

16. The charger integrated circuit of claim 1, further comprising:

a current control circuit configured to generate a first current control signal for the direct charger, a second current control signal for the buck converter, and a third current control signal for the linear charger.

17. The charger integrated circuit of claim 16, further comprising:

a current sensing circuit configured to generate a first sensing signal by detecting the first charging current and the first current that flow through the direct charger, to generate a second sensing signal by detecting the second current and the second system current that flow through the buck converter, and to generate a third sensing signal by detecting the first charging current and the second charging current flowing through the linear charger, and wherein the current control circuit is configured to generate the first current control signal based on the first sensing signal, the second current control signal based on the second sensing signal, and the third current control signal based on the third sensing signal.

18. The charger integrated circuit of claim 1, wherein, in response to not receiving the input voltage from the input terminal, the switched capacitor is configured to generate a third system current provided based on a battery current supplied from the battery device, the third system current provided to the system load.

19. An electronic device comprising:

a battery device including a first battery and a second battery connected in series;

a charger integrated circuit configured to charge the battery device; and a system load configured to operate based on an input voltage received from an input terminal and a battery voltage received from the battery device, wherein the charger integrated circuit includes a direct charger configured to generate a first charging current and a first current based on the input voltage, the first charging current used to charge the battery device, the first current used to generate a first system current, and the first system current provided to the system load, a buck converter configured to generate a second current and a second system current based on the input voltage, the second current used to generate a second charging current, the second charging current used to charge the battery device, and the second system current provided to the system load, a switched capacitor configured to generate the first system current based on the first current, and to generate the second charging current based on the second current, and a linear charger configured to provide the first charging current and the second charging current to the battery device.

20. A charger integrated circuit configured to charge a battery device including a first battery and a second battery connected in series, the charger integrated circuit comprising:

a direct charger including a first switch and a second switch connected in series between an input terminal and a control node, the direct charger configured to enable in response to an input voltage having a variable voltage level, to generate a first charging current and a first current based on the input voltage while enabled, and to disable in response to the input voltage having a fixed voltage level, the input voltage received from the input terminal, the first charging current used to charge the battery device, the first current used to generate a first system current, the first system current provided to a system load;

a buck converter including a third switch, a fourth switch and a fifth switch connected in series between the input terminal and a ground voltage, and a first inductor connected between a switching node and a system node, the switching node between the fourth switch and the fifth switch, the system node connected to the system load, the buck converter configured to enable in response to the input voltage having the fixed voltage level, to generate a second current and a second system current based on the input voltage while enabled, and to disable in response to the input voltage having the variable voltage level, the second current used to generate a second charging current, the second charging current used to charge the battery device, and the second system current provided to the system load;

a switched capacitor configured to generate the first system current based on the first current in response to the input voltage having the variable voltage level, and to generate the second charging current based on the second current in response to the input voltage having the fixed voltage level; and a linear charger configured to provide the first charging current to the battery device in response to the input voltage having the variable voltage level, and to provide the second charging current to the battery device in response to the input voltage having the fixed voltage level, the linear charger including a sixth switch connected between the control node and the battery device, and each of the first switch, the second switch, the third switch, the fourth switch, the fifth switch and the sixth switch including one transistor and one diode.

* * * * *